US008607744B2

(12) United States Patent
Alexander et al.

(10) Patent No.: US 8,607,744 B2
(45) Date of Patent: Dec. 17, 2013

(54) ACTIVE AIR VENT UTILIZING SMART MATERIAL ACTUATION

(75) Inventors: Paul W. Alexander, Ypsilanti, MI (US); Alan L. Browne, Grosse Pointe, MI (US); Xiujie Gao, Troy, MI (US); Thomas H. Froling, Beverly Hills, MI (US); Richard J. Skurkis, Lake Orion, MI (US); Matthew D. Scrase, Troy, MI (US); Clifford Jason Yee, Novi, MI (US); Evan P. Joranlien, Shelby Township, MI (US); Mark D. Dickens, Ortonville, MI (US); Arnold G Warner, Durand, MI (US); Laurence M Lemaire, Ferndale, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1377 days.

(21) Appl. No.: 12/344,376

(22) Filed: Dec. 26, 2008

(65) Prior Publication Data

US 2009/0173305 A1    Jul. 9, 2009

Related U.S. Application Data

(60) Provisional application No. 61/018,954, filed on Jan. 4, 2008.

(51) Int. Cl.
*F01P 7/02* (2006.01)
(52) U.S. Cl.
USPC .................. 123/41.05; 123/41.06; 180/68.1

(58) Field of Classification Search
USPC ............................ 123/41.04–41.07; 180/68.1
See application file for complete search history.

(56) References Cited

U.S. PATENT DOCUMENTS

| | | | | |
|---|---|---|---|---|
| 1,614,075 | A | * 1/1927 | McCaleb | 123/41.06 |
| 4,332,187 | A | 6/1982 | Imai et al. | |
| 5,036,803 | A | * 8/1991 | Nolting et al. | 123/41.05 |
| 5,618,323 | A | 4/1997 | Shearn et al. | |
| 6,532,909 | B2 | * 3/2003 | Stauder et al. | 123/41.04 |
| 7,059,664 | B2 | * 6/2006 | Aase et al. | 244/201 |

FOREIGN PATENT DOCUMENTS

| | | |
|---|---|---|
| DE | 19601596 | 11/1996 |
| EP | 1362732 | 11/2003 |
| JP | 58180717 A * | 10/1983 |
| JP | 59059521 A * | 4/1984 |
| JP | 2000-264252 A | 9/2000 |
| JP | 2002-339755 A | 11/2002 |
| KR | 10-1998-0040193 A | 8/1998 |

* cited by examiner

*Primary Examiner* — Noah Kamen

(57) ABSTRACT

An active air intake adapted for selectively regulating fluid flow into an engine generally includes a housing defining an opening, a covering member disposed relative to the opening and translatable between opened and closed conditions, an actuator including an active material element operable to effect movement of the member, a load limit protector configured to present a secondary output path for the element, an overheat protection mechanism for preventing unintentional activation and stress loads in the element, a biasing mechanism for returning the member to the original condition, and a latching mechanism for retaining the member in the closed condition.

14 Claims, 16 Drawing Sheets

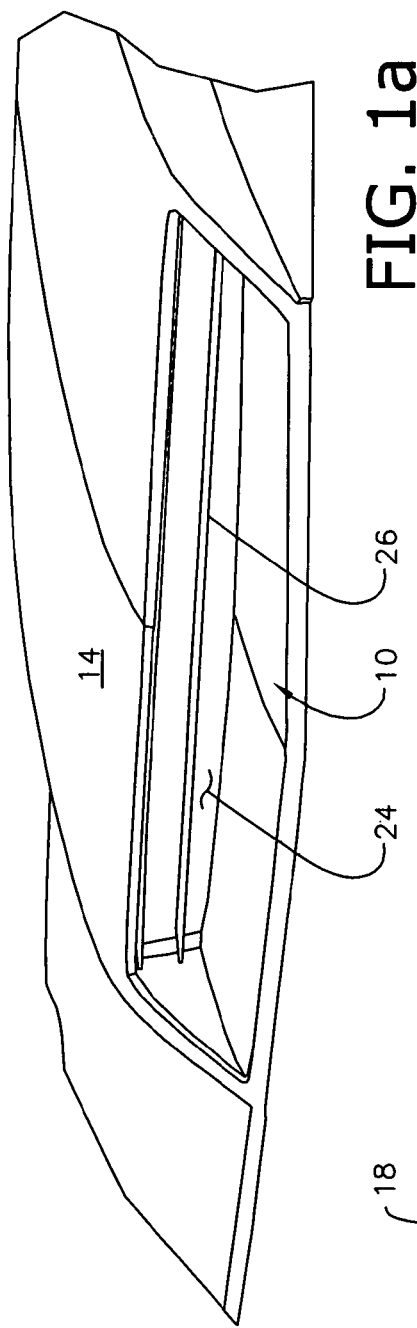
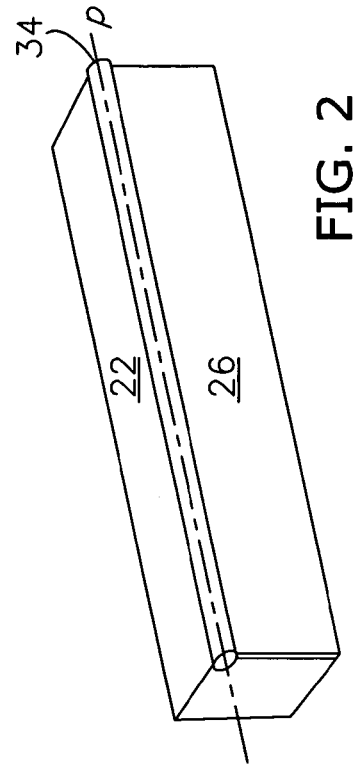
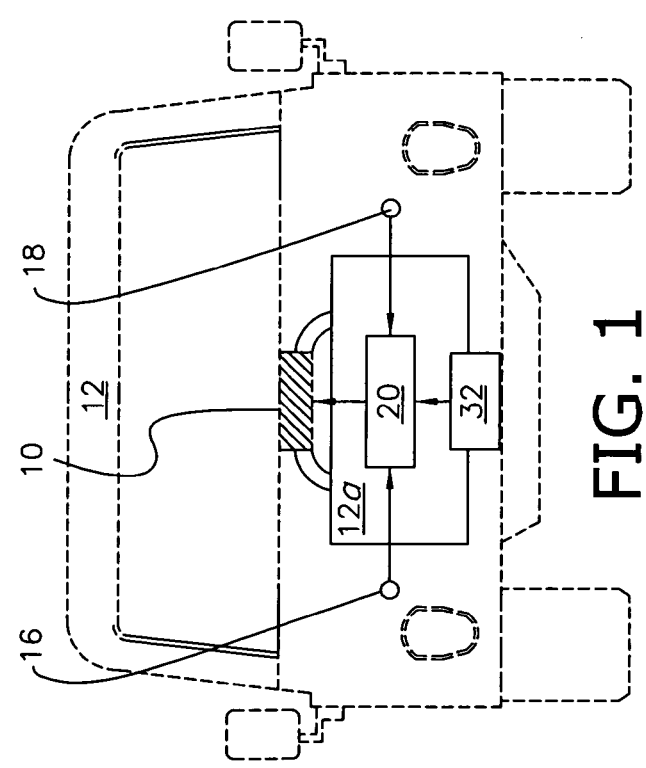

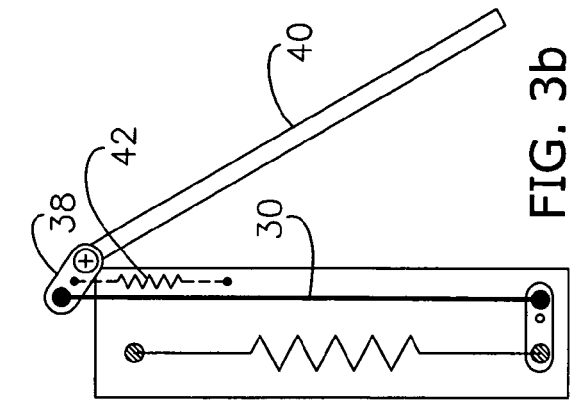
FIG. 3b
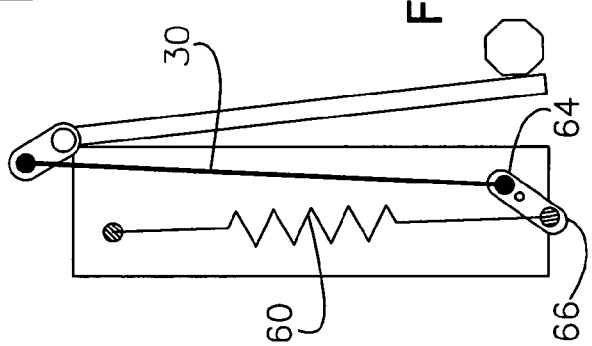
FIG. 3d
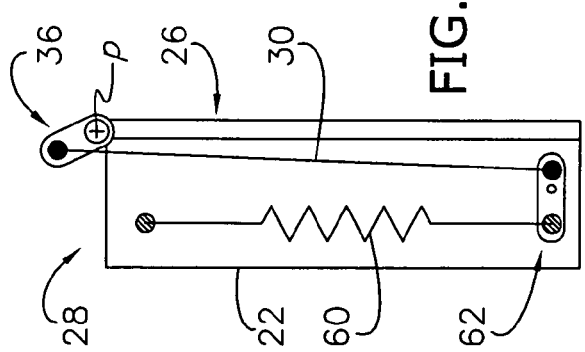
FIG. 3a
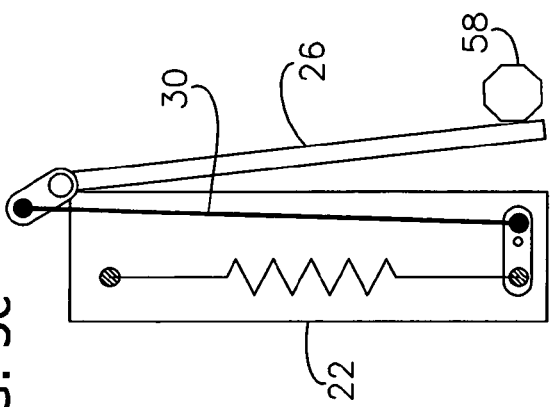
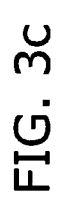
FIG. 3c

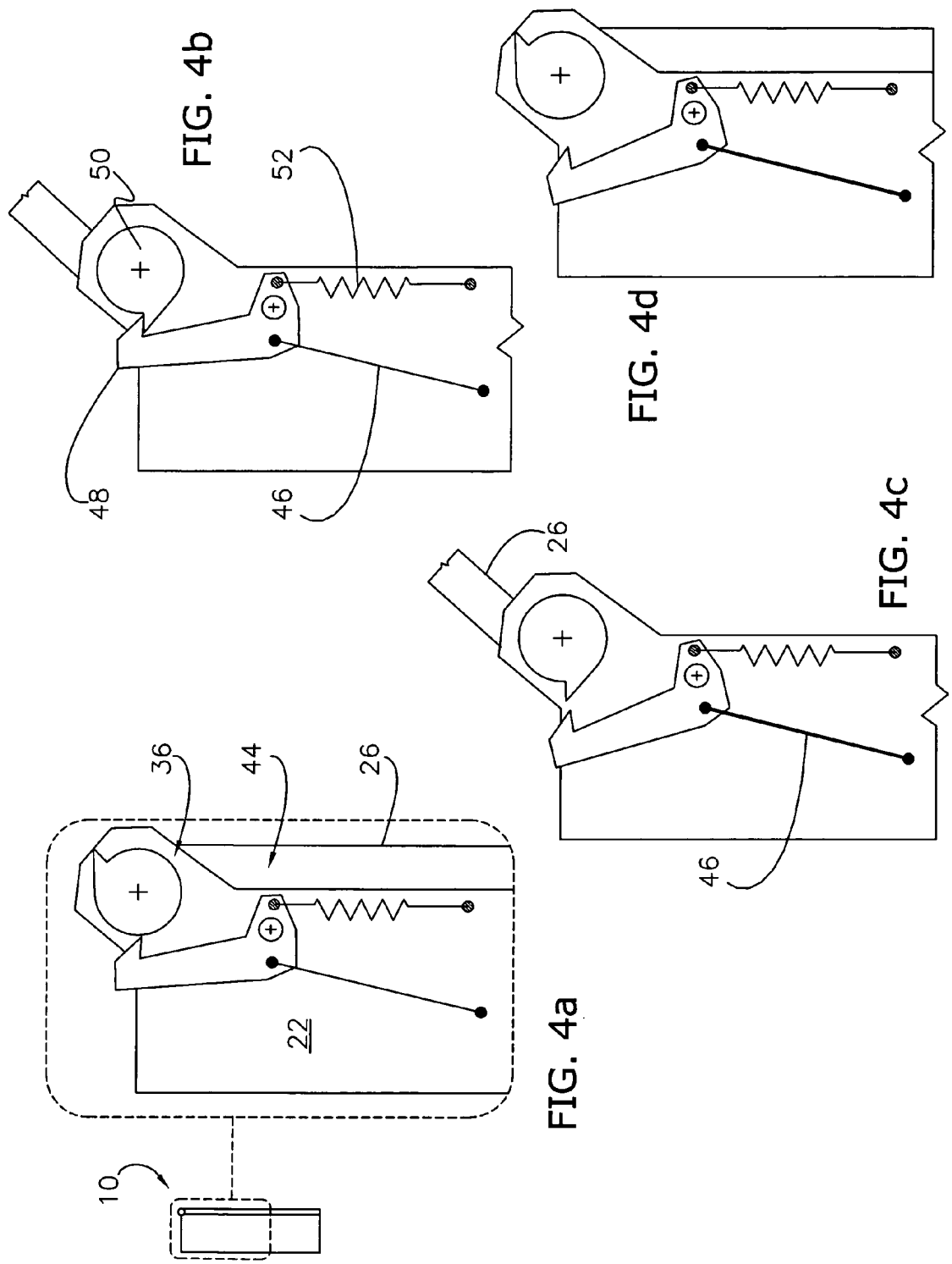

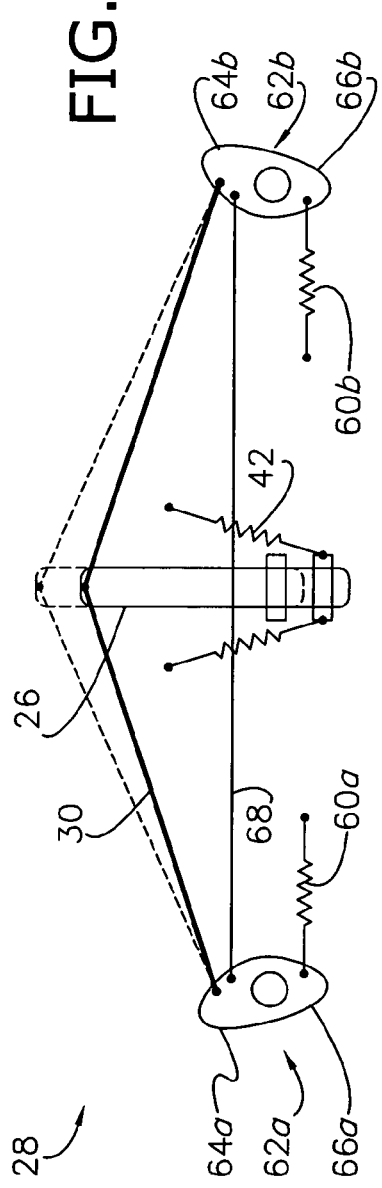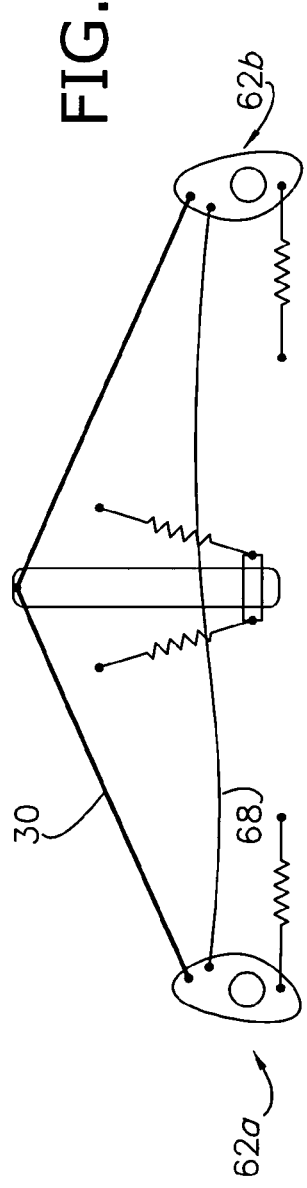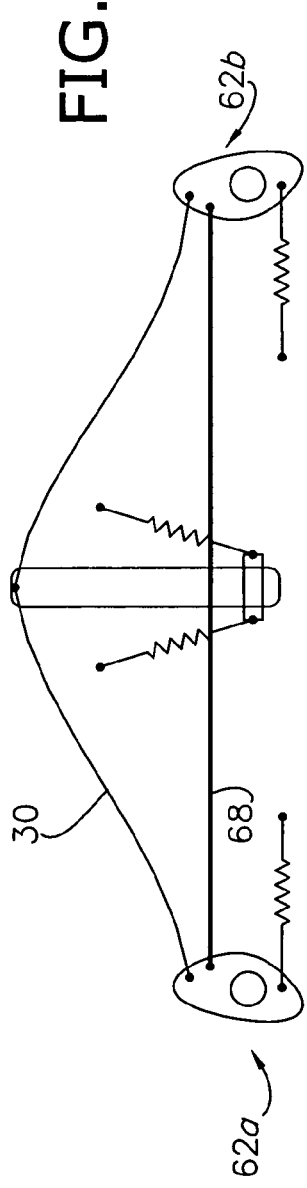

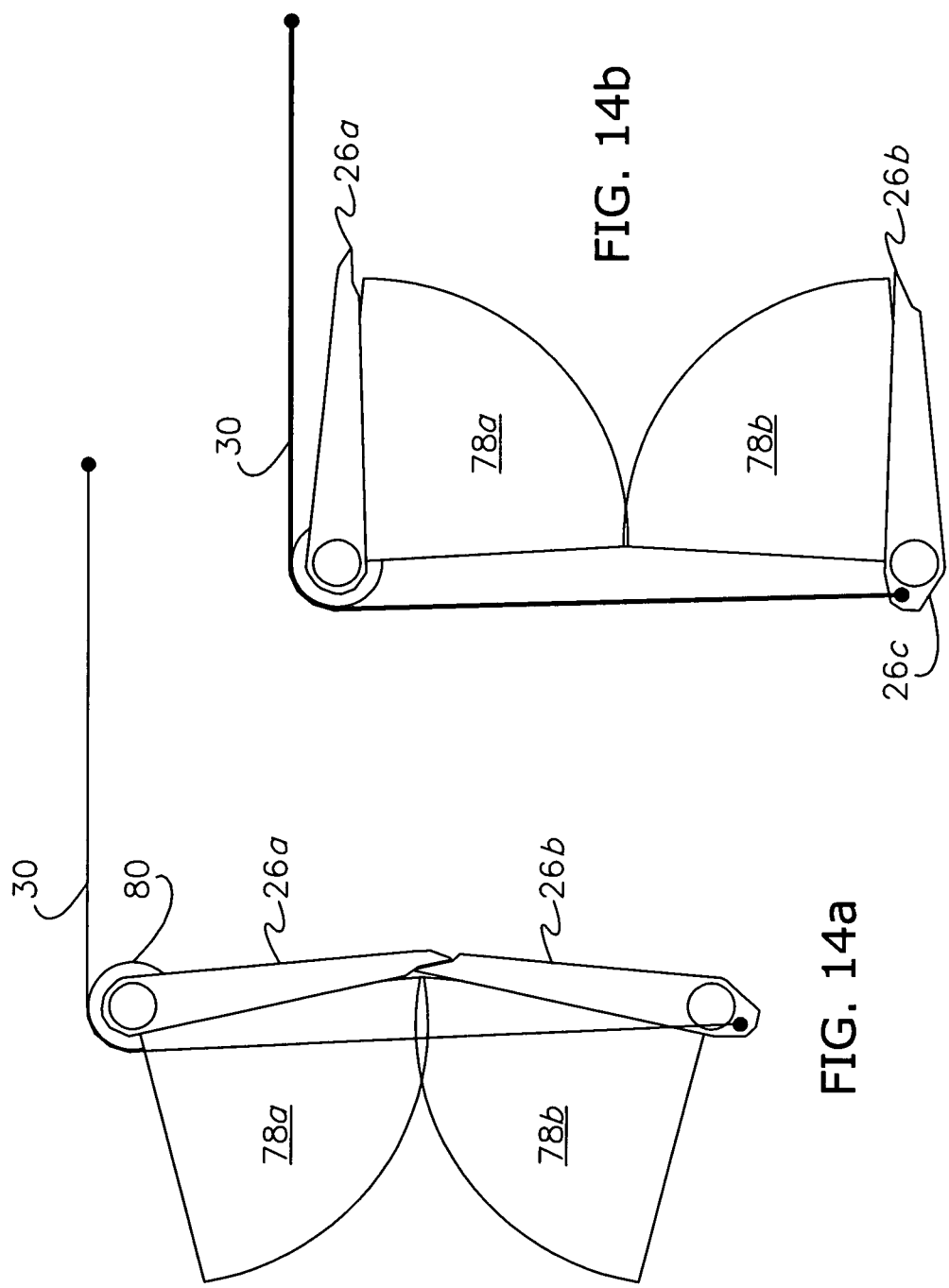

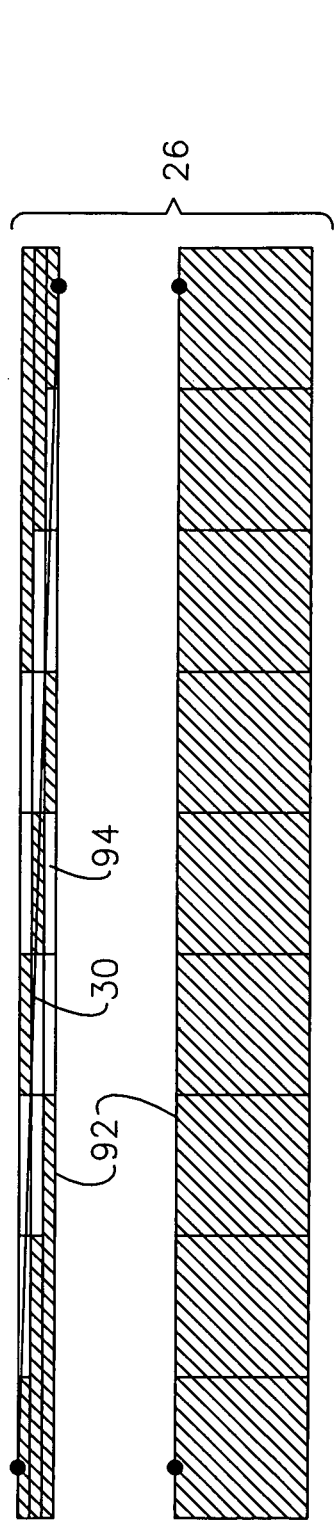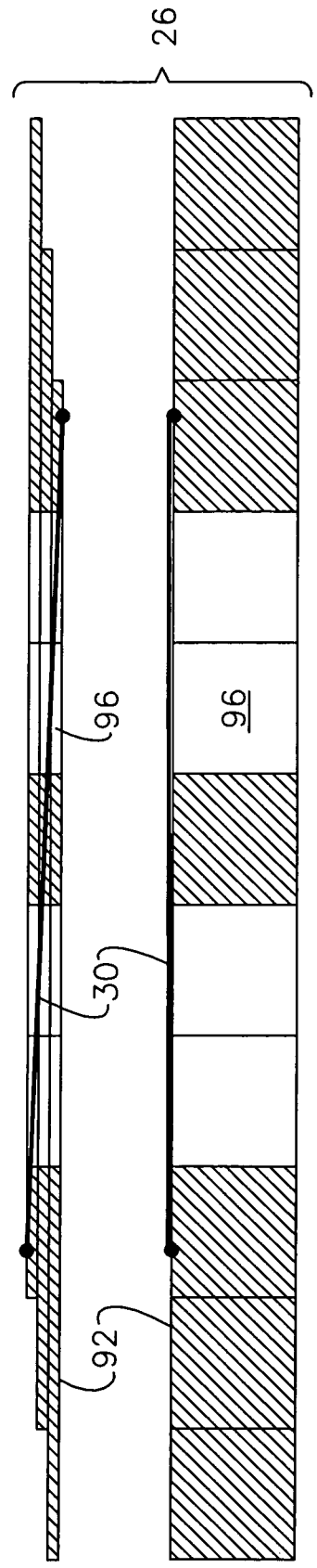
FIG. 17a
FIG. 17b

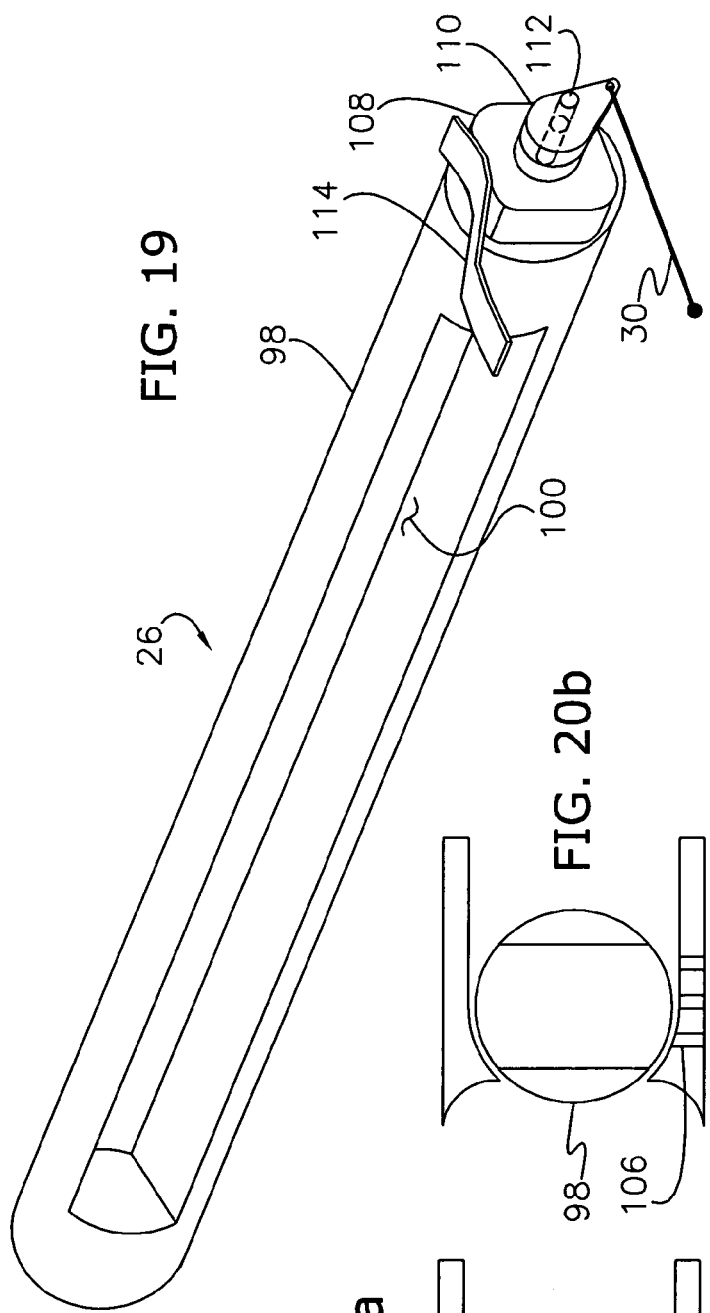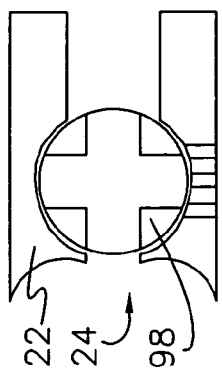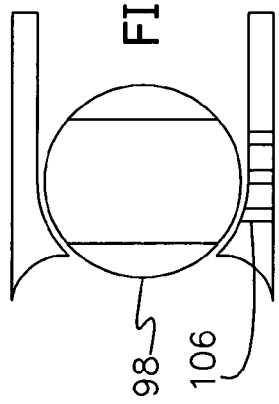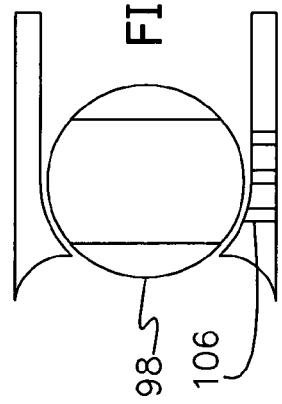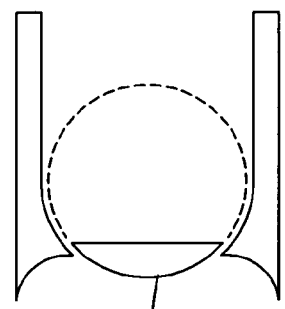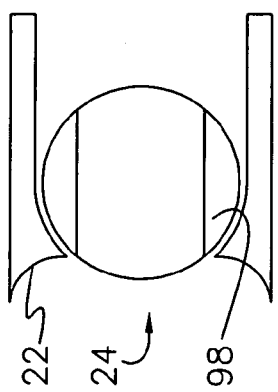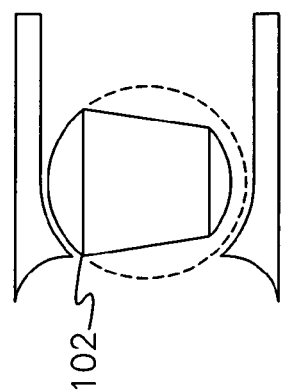

ACTIVE AIR VENT UTILIZING SMART MATERIAL ACTUATION

BACKGROUND OF THE INVENTION

1. Field of the Invention

The present invention relates to active air intakes, and methods of regulating fluid flow into an internal combustion engine. More particularly, the invention concerns active air intakes utilizing active material actuation and corresponding latching, biasing, and overload/overheating protection configurations.

2. Discussion of Prior Art

Air intake systems, such as those adapted for use with an internal combustion engine, have been developed to manage the inflow of air, moisture and air-borne particulate matter into the engine. In an automotive setting, for example, air is typically fed into a conduit and/or manifold assembly prior to being combined with fuel to form an air/fuel mixture suitable for combustion. The ability to control the inflow of air enables the mixture to be modified desirably. As such, active air intakes have been developed that are manipulable at least between closed and opened conditions. Conventionally, active air intakes typically include rotatable louvers, reconfigurable sliding gates, or other translatable covers, and motors, solenoids or other mechanical devices that selectively cause the rotation, reconfiguration, and/or translation. Conventional active intakes, however, present various concerns in the art. For example, the addition of various electrical and mechanical components have resulted in packaging difficulty, an increase in mass and complexity, and reduced reliability in comparison to non-active configurations.

SUMMARY OF THE INVENTION

The present invention presents an active air intake system and method of regulating fluid flow into an engine utilizing active material actuation to reduce or treat the afore-mentioned concerns. That is to say, the inventive intake is useful for improving packaging options, reduces functionally equivalent mass and complexity/number of moving parts, and is more reliable, in comparison to conventional active air intake systems. The invention is useful for reducing operative noise (both acoustically and with respect to EMF) and other energy waste/by-product associated with conventional actuation. The inventive intake and method utilize the ability of active materials to change with respect to elastic modulus, shape or an otherwise fundamental property, when activated to more efficiently effect opening and/or closing a fluid conduit. The invention is further useful for providing an active air intake that features a fail closed and air assisted closing/sealing configuration.

A first aspect of the invention concerns an active air intake adapted for use with an internal combustion engine. The intake includes a housing defining an opening in fluid communication with an ambient environment and the engine. The intake further includes at least one member translatable, so as to be caused to move between open and closed conditions, as well as intermediate positions, relative to the opening. The member covers at least a portion of the opening in the closed condition, and does not obstruct the portion, so as to allow fluid flow between the environment and the engine, in the opened condition. Finally, at least one actuator is drivenly coupled to the member, and includes an active material element operable to undergo a reversible change in fundamental property when exposed to an activation signal. The actuator is configured such that the change is operable to cause the member to move to one of the open and closed conditions.

A second aspect of the invention concerns a method of selectively modifying a fluid flow into the engine. The method comprises the steps of fluidly coupling the engine to an ambient environment through an opening, so as to allow a fluid flow therebetween, and securing an active material element relative to the opening. Next, a sample value of an environment condition or vehicle characteristic is determined, and the sample value is compared to a threshold, so as to determine a non-compliant condition. When the sample value exceeds the threshold, the element is activated, and the opening is modified, so as to modify the fluid flow, as a result of activating the element. At least one sensor is preferably used to autonomously determine the sample value.

Other aspects and advantages of the present invention, including preferred intake configurations and methods utilizing shape memory wire actuators, single and multi-vane louvers, rotatable drums, bow-string actuators, latching and overload protection devices, and more will be apparent from the following detailed description of the preferred embodiment(s) and the accompanying drawing figures.

BRIEF DESCRIPTION OF THE SEVERAL VIEWS OF THE DRAWING

A preferred embodiment(s) of the invention is described in detail below with reference to the attached drawing figures, wherein perspective illustrations represent a scaled drawing of the particular embodiment depicted:

FIG. 1 is a front elevation of a vehicle including an active air intake coupled to a sensor, input device, controller and power supply, in accordance with a preferred embodiment of the invention;

FIG. 1a is a perspective view of a vehicle hood scoop, and an active intake functioning therein, in accordance with a preferred embodiment of the invention;

FIG. 2 is a perspective view of a single-vane or flap active intake, in accordance with a preferred embodiment of the invention;

FIG. 3a is a side elevation of the intake shown in FIG. 2, particularly illustrating the flap in a closed condition and an active-material actuator, including a shape memory alloy wire and biasing spring, drivenly coupled thereto;

FIG. 3b is a side elevation of the intake shown in FIGS. 3-3a, wherein the flap is in an opened condition caused by the activation of the wire;

FIG. 3c is a side elevation of the intake shown in FIGS. 3-3b, wherein the motion of the flap is obstructed by a foreign object, as the wire is being activated;

FIG. 3d is a side elevation of the intake shown in FIGS. 3-3c, wherein the load limit protector is engaged to provide a secondary output path for the element, as a result of the blockage;

FIG. 4a is a side elevation of an active-material based intake, particularly illustrating the pivot axis of the flap, and a ratchet based latching mechanism including a pawl, gear connector, shape memory alloy wire and biasing spring in enlarged caption view, in accordance with a preferred embodiment of the present invention;

FIG. 4b is an enlarged caption of the pivot axis and latching mechanism shown in FIG. 4a, wherein the flap has been swung to an opened condition, such that the pawl is engaged by the gear;

FIG. 4c is an enlarged caption of the pivot axis and latching mechanism shown in FIG. 4a, wherein the wire has been activated, so as to disengage the pawl and gear;

FIG. 4*d* is an enlarged caption of the pivot axis and latching mechanism shown in FIG. 4*a*, wherein the flap has returned to the closed condition but the wire has not been allowed to cool;

FIG. 6*a* is a schematic elevation of an active intake actuator moving a member, and including a shape memory actuator wire in a bow-string configuration, first and second return springs, a load protector including first and second extension springs and levers, and an overheat protection mechanism consisting of an auxiliary SMA wire interconnecting the levers, in accordance with a preferred embodiment of the invention;

FIG. 6*b* is a schematic elevation of the actuator shown in FIG. 6*a*, wherein the load protector has been actuated;

FIG. 6*c* is a schematic elevation of the actuator shown in FIG. 6*a*, wherein the overheat protection mechanism has been actuated;

FIG. 14*a* is a side elevation of the intake shown in FIG. 13, wherein the actuator further includes a pulley, and the wire is in a linear configuration so as to be entrained and redirected by the pulley, in accordance with a preferred embodiment of the invention;

FIG. 14*b* is a side elevation of the intake shown in FIG. 14*a*, wherein the wire has been activated, and the vanes caused to swing forward as a result thereof;

FIG. 17*a* are front and top views of a multi-panel covering member, wherein the panels are interconnected by a shape memory alloy actuator wire, and each panel defines a plurality of (four) panel holes, and the holes are completely offset, in accordance with a preferred embodiment of the invention;

FIG. 17*b* are front and top views of the member shown in FIG. 17*a*, wherein the wire has been activated, and the holes are completely aligned so as to define a plurality of four through-holes;

FIG. 19 is a perspective view of a drum covering member, a ratchet interface latching mechanism including a pawl, and leaf spring, and a shape memory actuator wire, in accordance with a preferred embodiment of the invention;

FIG. 20*a* is a side elevation of a drum and housing, wherein the drum is in the opened condition;

FIG. 20*b* is a side elevation of the drum and housing shown in FIG. 20*a*, wherein the drum is in the closed condition, and the housing further defines drain holes;

FIG. 21 is a side elevation of a non-symmetrical drum and housing, in accordance with a preferred embodiment of the invention;

FIG. 22 is a side elevation of a half drum and housing, in accordance with a preferred embodiment of the invention; and FIG. 23 is a side elevation of a drum and housing, wherein the drum defines first and second orthogonally crossed slots, in accordance with a preferred embodiment of the invention.

DETAILED DESCRIPTION OF THE PREFERRED EMBODIMENT(S)

Figure 5C:
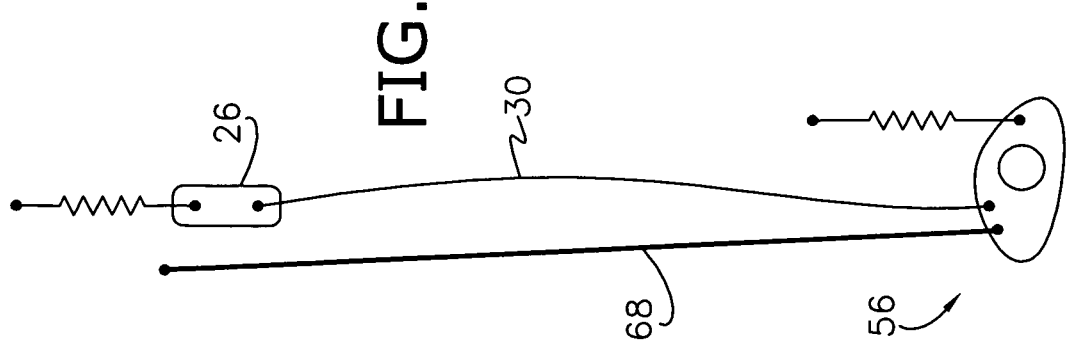
FIG. 5*c* is a schematic elevation of the actuator shown in FIG. 5*a*, wherein the overheat protection mechanism has been actuated.

The present invention concerns an active air intake system (i.e., "intake") 10 that utilizes active material actuation to effect functionality. That is to say, active material actuation can be used to drive one or more of the intake functions including but not limited to latching, unlatching, opening, and closing of the moving parts of the air intake system 10; moreover, they can be used in combination with traditional means of actuation to provide a separate function or to assist on the same function (such as to boost the force level beyond that which could be provided by the traditional actuator when required). The intake 10 is described and illustrated herein with respect to the internal combustion engine 12a of a vehicle 12, and may be incorporated in the hood scoop 14 of a "hood vent", as shown in FIG. 1a; however, it is appreciated that the benefits and advantages of the inventive intake 10 may be utilized in other applications, such as variable outlets, exhausts, HVAC registries, or where ever improved management of air, particulate, and/or moisture flow into an opening is desired.

The invention provides means for selectively allowing or restricting (e.g., increasing or reducing) the flow of ambient air into an internal combustion engine 12a, wherein selectivity may be triggered by ambient conditions, such as air moisture content or humidity, adjacent fluid flow rates, or vehicle characteristics/conditions, such as the vehicle speed, engine speed/torque/temperature, windshield wiper actuation, time, and GPS/map positioning or other telematic information. As such, the inventive system 10 preferably includes at least one sensor 16 operable to determine the relevant characteristic and/or condition; and/or an input device 18 communicatively coupled to a controller 20 having stored thereupon for processing, an actuation module (FIG. 1).

I. Active Material Discussion and Function

As used herein the term "active material" shall be afforded its ordinary meaning as understood by those of ordinary skill in the art, and includes any material or composite that exhibits a reversible change in a fundamental (e.g., chemical or intrinsic physical) property, when exposed to an external signal source. Thus, active materials shall include those compositions that can exhibit a change in stiffness properties, shape and/or dimensions in response to the activation signal, which can take the type for different active materials, of electrical, magnetic, thermal and like fields.

Suitable active materials for use with the present invention include but are not limited to shape memory materials such as shape memory alloys, and shape memory polymers. Shape memory materials generally refer to materials or compositions that have the ability to remember their original at least one attribute such as shape, which can subsequently be recalled by applying an external stimulus. As such, deformation from the original shape is a temporary condition. In this manner, shape memory materials can change to the trained shape in response to an activation signal. Exemplary shape memory materials include the afore-mentioned shape memory alloys (SMA) and shape memory polymers (SMP), as well as shape memory ceramics, electroactive polymers (EAP), ferromagnetic SMA'S, electrorheological (ER) compositions, magnetorheological (MR) compositions, dielectric elastomers, piezoelectric polymers, piezoelectric ceramics, various combinations of the foregoing materials, and the like.

Shape memory alloys (SMA's) generally refer to a group of metallic materials that demonstrate the ability to return to some previously defined shape or size when subjected to an appropriate thermal stimulus. Shape memory alloys are capable of undergoing phase transitions in which their yield strength, stiffness, dimension and/or shape are altered as a function of temperature. The term "yield strength" refers to the stress at which a material exhibits a specified deviation from proportionality of stress and strain. Generally, in the low temperature, or martensite phase, shape memory alloys can be plastically deformed and upon exposure to some higher temperature will transform to an austenite phase, or parent phase, returning to their shape prior to the deformation. Materials that exhibit this shape memory effect only upon heating are referred to as having one-way shape memory. Those materials that also exhibit shape memory upon re-cooling are referred to as having two-way shape memory behavior.

Shape memory alloys exist in several different temperature-dependent phases. The most commonly utilized of these phases are the so-called marten site and austenite phases discussed above. In the following discussion, the martensite phase generally refers to the more deformable, lower temperature phase whereas the austenite phase generally refers to the more rigid, higher temperature phase. When the shape memory alloy is in the martensite phase and is heated, it begins to change into the austenite phase. The temperature at which this phenomenon starts is often referred to as austenite start temperature ($A_s$). The temperature at which this phenomenon is complete is called the austenite finish temperature ($A_f$). Activation may be effected by temperature change caused by electric current signalization (e.g, through electric leads (not shown) connected to the vehicle charging system and battery), fluid flow transduction (e.g., through selective engagement with the vehicle cooling system (also not shown)), or other physical or chemical conversion.

When the shape memory alloy is in the austenite phase and is cooled, it begins to change into the martensite phase, and the temperature at which this phenomenon starts is referred to as the martensite start temperature ($M_s$). The temperature at which austenite finishes transforming to marten site is called the martensite finish temperature ($M_f$). Generally, the shape memory alloys are softer and more easily deformable in their martensitic phase and are harder, stiffer, and/or more rigid in the austenitic phase. In view of the foregoing, a suitable activation signal for use with shape memory alloys is a thermal activation signal having a magnitude to cause transformations between the martensite and austenite phases.

Shape memory alloys can exhibit a one-way shape memory effect, an intrinsic two-way effect, or an extrinsic two-way shape memory effect depending on the alloy composition and processing history. Annealed shape memory alloys typically only exhibit the one-way shape memory effect. Sufficient heating subsequent to low-temperature deformation of the shape memory material will induce the martensite to austenite type transition, and the material will recover the original, annealed shape. Hence, one-way shape memory effects are only observed upon heating. Active materials comprising shape memory alloy compositions that exhibit one-way memory effects do not automatically reform, and will likely require an external mechanical force to reform the shape that was previously suitable for airflow control.

Intrinsic and extrinsic two-way shape memory materials are characterized by a shape transition both upon heating from the martensite phase to the austenite phase, as well as an additional shape transition upon cooling from the austenite phase back to the martensite phase. Active materials that exhibit an intrinsic shape memory effect are fabricated from a shape memory alloy composition that will cause the active materials to automatically reform themselves as a result of the above noted phase transformations. Intrinsic two-way shape memory behavior must be induced in the shape memory material through processing. Such procedures include extreme deformation of the material while in the martensite phase, heating-cooling under constraint or load, or surface modification such as laser annealing, polishing, or shot-peening. Once the material has been trained to exhibit the two-way shape memory effect, the shape change between the low and high temperature states is generally reversible and persists through a high number of thermal cycles. In contrast, active materials that exhibit the extrinsic two-way shape memory effects are composite or multi-component materials that combine a shape memory alloy composition that exhibits a one-way effect with another element that provides a restoring force to reform the original shape.

The temperature at which the shape memory alloy remembers its high temperature form when heated can be adjusted by slight changes in the composition of the alloy and through heat treatment. In nickel-titanium shape memory alloys, for instance, it can be changed from above about 100° C. to below about −100° C. The shape recovery process occurs over a range of just a few degrees and the start or finish of the transformation can be controlled to within a degree or two depending on the desired application and alloy composition. The mechanical properties of the shape memory alloy vary greatly over the temperature range spanning their transformation, typically providing the system with shape memory effects, super-elastic effects, and high damping capacity.

Suitable shape memory alloy materials include, without limitation, nickel-titanium based alloys, indium-titanium based alloys, nickel-aluminum based alloys, nickel-gallium based alloys, copper based alloys (e.g., copper-zinc alloys, copper-aluminum alloys, copper-gold, and copper-tin alloys), gold-cadmium based alloys, silver-cadmium based alloys, indium-cadmium based alloys, manganese-copper based alloys, iron-platinum based alloys, iron-platinum based alloys, iron-palladium based alloys, and the like. The alloys can be binary, ternary, or any higher order so long as the alloy composition exhibits a shape memory effect, e.g., change in shape orientation, damping capacity, and the like.

Thus, for the purposes of this invention, it is appreciated that SMA's exhibit a modulus increase of 2.5 times and a dimensional change of up to 8% (depending on the amount of pre-strain) when heated above their Martensite to Austenite phase transition temperature. It is appreciated that thermally induced SMA phase changes are one-way so that a biasing force return mechanism (such as a spring) would be required to return the SMA to its starting configuration once the applied field is removed. Joule heating can be used to make the entire system electronically controllable. Stress induced phase changes in SMA are, however, two way by nature. Application of sufficient stress when an SMA is in its Austenitic phase will cause it to change to its lower modulus Martensitic phase in which it can exhibit up to 8% of "superelastic" deformation. Removal of the applied stress will cause the SMA to switch back to its Austenitic phase in so doing recovering its starting shape and higher modulus.

Ferromagnetic SMA's (FSMA's), which are a sub-class of SMAs, may also be used in the present invention. These materials behave like conventional SMA materials that have a stress or thermally induced phase transformation between martensite and austenite. Additionally FSMA's are ferromagnetic and have strong magnetocrystalline anisotropy, which permit an external magnetic field to influence the orientation/fraction of field aligned martensitic variants. When the magnetic field is removed, the material may exhibit complete two-way, partial two-way or one-way shape memory. For partial or one-way shape memory, an external stimulus, temperature, magnetic field or stress may permit the material to return to its starting state. Perfect two-way shape memory may be used for proportional control with continuous power supplied. External magnetic fields are generally produced via soft-magnetic core electromagnets in automotive applications, though a pair of Helmholtz coils may also be used for fast response.

Shape memory polymers (SMP's) generally refer to a group of polymeric materials that demonstrate the ability to return to a previously defined shape when subjected to an appropriate thermal stimulus. Shape memory polymers are capable of undergoing phase transitions in which their shape is altered as a function of temperature. Generally, SMP's have two main segments, a hard segment and a soft segment. The previously defined or permanent shape can be set by melting or processing the polymer at a temperature higher than the highest thermal transition followed by cooling below that thermal transition temperature. The highest thermal transition is usually the glass transition temperature ($T_g$) or melting point of the hard segment. A temporary shape can be set by heating the material to a temperature higher than the $T_g$ or the transition temperature of the soft segment, but lower than the $T_g$ or melting point of the hard segment. The temporary shape is set while processing the material at the transition temperature of the soft segment followed by cooling to fix the shape. The material can be reverted back to the permanent shape by heating the material above the transition temperature of the soft segment.

For example, the permanent shape of the polymeric material may be a wire presenting a substantially straightened shape and defining a first length, while the temporary shape may be a similar wire defining a second length less than the first. In another embodiment, the material may present a spring having a first modulus of elasticity when activated and second modulus when deactivated.

The temperature needed for permanent shape recovery can be set at any temperature between about −63° C. and about 120° C. or above. Engineering the composition and structure of the polymer itself can allow for the choice of a particular temperature for a desired application. A preferred temperature for shape recovery is greater than or equal to about −30° C., more preferably greater than or equal to about 0° C., and most preferably a temperature greater than or equal to about 50° C. Also, a preferred temperature for shape recovery is less than or equal to about 120° C., and most preferably less than or equal to about 120° C. and greater than or equal to about 80° C.

Suitable shape memory polymers include thermoplastics, thermosets, interpenetrating networks, semi-interpenetrating networks, or mixed networks. The polymers can be a single polymer or a blend of polymers. The polymers can be linear or branched thermoplastic elastomers with side chains or dendritic structural elements. Suitable polymer components to form a shape memory polymer include, but are not limited to, polyphosphazenes, poly(vinyl alcohols), polyamides, polyester amides, poly(amino acid)s, polyanhydrides, polycarbonates, polyacrylates, polyalkylenes, polyacrylamides, polyalkylene glycols, polyalkylene oxides, polyalkylene terephthalates, polyortho esters, polyvinyl ethers, polyvinyl esters, polyvinyl halides, polyesters, polylactides, polyglycolides, polysiloxanes, polyurethanes, polyethers, polyether amides, polyether esters, and copolymers thereof. Examples of suitable polyacrylates include poly(methyl methacrylate), poly(ethyl methacrylate), ply(butyl methacrylate), poly(isobutyl methacrylate), poly(hexyl methacrylate), poly(isodecyl methacrylate), poly(lauryl methacrylate), poly(phenyl methacrylate), poly(methyl acrylate), poly(isopropyl acrylate), poly(isobutyl acrylate) and poly(octadecyl acrylate).

Examples of other suitable polymers include polystyrene, polypropylene, polyvinyl phenol, polyvinylpyrrolidone, chlorinated polybutylene, poly(octadecyl vinyl ether) ethylene vinyl acetate, polyethylene, poly(ethylene oxide)-poly(ethylene terephthalate), polyethylene/nylon (graft copolymer), polycaprolactones-polyamide (block copolymer), poly(caprolactone) dimethacrylate-n-butyl acrylate, poly(norbornyl-polyhedral oligomeric silsequioxane), polyvinylchloride, urethane/butadiene copolymers, polyurethane block copolymers, styrene-butadiene-styrene block copolymers, and the like.

Thus, for the purposes of this invention, it is appreciated that SMP's exhibit a dramatic drop in modulus when heated above the glass transition temperature of their constituent that has a lower glass transition temperature. If loading/deformation is maintained while the temperature is dropped, the deformed shape will be set in the SMP until it is reheated while under no load under which condition it will return to its as-molded shape. While SMP's could be used variously in block, sheet, slab, lattice, truss, fiber or foam forms, they require continuous power to remain in their lower modulus state.

Suitable piezoelectric materials include, but are not intended to be limited to, inorganic compounds, organic compounds, and metals. With regard to organic materials, all of the polymeric materials with non-centrosymmetric structure and large dipole moment group(s) on the main chain or on the side-chain, or on both chains within the molecules, can be used as suitable candidates for the piezoelectric film. Exemplary polymers include, for example, but are not limited to, poly(sodium 4-styrenesulfonate), poly (poly(vinylamine) backbone azo chromophore), and their derivatives; polyfluorocarbons, including polyvinylidenefluoride, its co-polymer vinylidene fluoride ("VDF"), co-trifluoroethylene, and their derivatives; polychlorocarbons, including poly(vinyl chloride), polyvinylidene chloride, and their derivatives; polyacrylonitriles, and their derivatives; polycarboxylic acids, including poly(methacrylic acid), and their derivatives; polyureas, and their derivatives; polyurethanes, and their derivatives; bio-molecules such as poly-L-lactic acids and their derivatives, and cell membrane proteins, as well as phosphate bio-molecules such as phosphodilipids; polyanilines and their derivatives, and all of the derivatives of tetramines; polyamides including aromatic polyamides and polyimides, including Kapton and polyetherimide, and their derivatives; all of the membrane polymers; poly(N-vinyl pyrrolidone) (PVP) homopolymer, and its derivatives, and random PVP-co-vinyl acetate copolymers; and all of the aromatic polymers with dipole moment groups in the main-chain or side-chains, or in both the main-chain and the side-chains, and mixtures thereof.

Piezoelectric materials can also comprise metals selected from the group consisting of lead, antimony, manganese, tantalum, zirconium, niobium, lanthanum, platinum, palladium, nickel, tungsten, aluminum, strontium, titanium, barium, calcium, chromium, silver, iron, silicon, copper, alloys comprising at least one of the foregoing metals, and oxides comprising at least one of the foregoing metals. Suitable metal oxides include $SiO_2$, $Al_2O_3$, $ZrO_2$, $TiO_2$, $SrTiO_3$, $PbTiO_3$, $BaTiO_3$, $FeO_3$, $Fe_3O_4$, ZnO, and mixtures therof and Group VIA and IIB compounds, such as CdSe, CdS, GaAs, $AgCaSe_2$, ZnSe, GaP, InP, ZnS, and mixtures thereof. Preferably, the piezoelectric material is selected from the group consisting of polyvinylidene fluoride, lead zirconate titanate, and barium titanate, and mixtures thereof.

Suitable magnetorheological fluid materials include, but are not intended to be limited to, ferromagnetic or paramagnetic particles dispersed in a carrier fluid. Suitable particles include iron; iron alloys, such as those including aluminum, silicon, cobalt, nickel, vanadium, molybdenum, chromium, tungsten, manganese and/or copper; iron oxides, including $Fe_2O_3$ and $Fe_3O_4$; iron nitride; iron carbide; carbonyl iron; nickel and alloys of nickel; cobalt and alloys of cobalt; chromium dioxide; stainless steel; silicon steel; and the like. Examples of suitable particles include straight iron powders, reduced iron powders, iron oxide powder/straight iron powder mixtures and iron oxide powder/reduced iron powder mixtures. A preferred magnetic-responsive particulate is carbonyl iron, preferably, reduced carbonyl iron.

The particle size should be selected so that the particles exhibit multi-domain characteristics when subjected to a magnetic field. Diameter sizes for the particles can be less than or equal to about 1,000 micrometers, with less than or equal to about 500 micrometers preferred, and less than or equal to about 100 micrometers more preferred. Also preferred is a particle diameter of greater than or equal to about 0.1 micrometer, with greater than or equal to about 0.5 more preferred, and greater than or equal to about 10 micrometers especially preferred. The particles are preferably present in an amount between about 5.0 to about 50 percent by volume of the total MR fluid composition.

Suitable carrier fluids include organic liquids, especially non-polar organic liquids. Examples include, but are not limited to, silicone oils; mineral oils; paraffin oils; silicone copolymers; white oils; hydraulic oils; transformer oils; halogenated organic liquids, such as chlorinated hydrocarbons, halogenated paraffins, perfluorinated polyethers and fluorinated hydrocarbons; diesters; polyoxyalkylenes; fluorinated silicones; cyanoalkyl siloxanes; glycols; synthetic hydrocarbon oils, including both unsaturated and saturated; and combinations comprising at least one of the foregoing fluids.

The viscosity of the carrier component can be less than or equal to about 100,000 centipoise, with less than or equal to about 10,000 centipoise preferred, and less than or equal to about 1,000 centipoise more preferred. Also preferred is a viscosity of greater than or equal to about 1 centipoise, with greater than or equal to about 250 centipoise preferred, and greater than or equal to about 500 centipoise especially preferred.

Aqueous carrier fluids may also be used, especially those comprising hydrophilic mineral clays such as bentonite or hectorite. The aqueous carrier fluid may comprise water or water comprising a small amount of polar, water-miscible organic solvents such as methanol, ethanol, propanol, dimethyl sulfoxide, dimethyl formamide, ethylene carbonate, propylene carbonate, acetone, tetrahydrofuran, diethyl ether, ethylene glycol, propylene glycol, and the like. The amount of polar organic solvents is less than or equal to about 5.0% by volume of the total MR fluid, and preferably less than or equal to about 3.0%. Also, the amount of polar organic solvents is preferably greater than or equal to about 0.1%, and more preferably greater than or equal to about 1.0% by volume of the total MR fluid. The pH of the aqueous carrier fluid is preferably less than or equal to about 13, and preferably less than or equal to about 9.0. Also, the pH of the aqueous carrier fluid is greater than or equal to about 5.0, and preferably greater than or equal to about 8.0.

Natural or synthetic bentonite or hectorite may be used. The amount of bentonite or hectorite in the MR fluid is less than or equal to about 10 percent by weight of the total MR fluid, preferably less than or equal to about 8.0 percent by weight, and more preferably less than or equal to about 6.0 percent by weight. Preferably, the bentonite or hectorite is present in greater than or equal to about 0.1 percent by weight, more preferably greater than or equal to about 1.0 percent by weight, and especially preferred greater than or equal to about 2.0 percent by weight of the total MR fluid.

Optional components in the MR fluid include clays, organoclays, carboxylate soaps, dispersants, corrosion inhibitors, lubricants, extreme pressure anti-wear additives, antioxidants, thixotropic agents and conventional suspension agents. Carboxylate soaps include ferrous oleate, ferrous naphthenate, ferrous stearate, aluminum di- and tri-stearate, lithium stearate, calcium stearate, zinc stearate and sodium stearate, and surfactants such as sulfonates, phosphate esters, stearic acid, glycerol monooleate, sorbitan sesquioleate, laurates, fatty acids, fatty alcohols, fluoroaliphatic polymeric esters, and titanate, aluminate and zirconate coupling agents and the like. Polyalkylene diols, such as polyethylene glycol, and partially esterified polyols can also be included.

Suitable MR elastomer materials include, but are not intended to be limited to, an elastic polymer matrix comprising a suspension of ferromagnetic or paramagnetic particles, wherein the particles are described above. Suitable polymer matrices include, but are not limited to, poly-alpha-olefins, natural rubber, silicone, polybutadiene, polyethylene, polyisoprene, and the like.

Electroactive polymers include those polymeric materials that exhibit piezoelectric, pyroelectric, or electrostrictive properties in response to electrical or mechanical fields. An example of an electrostrictive-grafted elastomer with a piezoelectric poly(vinylidene fluoride-trifluoro-ethylene) copolymer. This combination has the ability to produce a varied amount of ferroelectric-electrostrictive, molecular composite systems. These may be operated as a piezoelectric sensor or even an electrostrictive actuator.

Materials suitable for use as an electroactive polymer may include any substantially insulating polymer or rubber (or combination thereof) that deforms in response to an electrostatic force or whose deformation results in a change in electric field. Exemplary materials suitable for use as a pre-strained polymer include silicone elastomers, acrylic elastomers, polyurethanes, thermoplastic elastomers, copolymers comprising PVDF, pressure-sensitive adhesives, fluoroelastomers, polymers comprising silicone and acrylic moieties, and the like. Polymers comprising silicone and acrylic moieties may include copolymers comprising silicone and acrylic moieties, polymer blends comprising a silicone elastomer and an acrylic elastomer, for example.

Materials used as an electroactive polymer may be selected based on one or more material properties such as a high electrical breakdown strength, a low modulus of elasticity (for large or small deformations), a high dielectric constant, and the like. In one embodiment, the polymer is selected such that is has an elastic modulus at most about 100 MPa. In another embodiment, the polymer is selected such that is has a maximum actuation pressure between about 0.05 MPa and about 10 MPa, and preferably between about 0.3 MPa and about 3 MPa. In another embodiment, the polymer is selected such that is has a dielectric constant between about 2 and about 20, and preferably between about 2.5 and about 12. The present disclosure is not intended to be limited to these ranges. Ideally, materials with a higher dielectric constant than the ranges given above would be desirable if the materials had both a high dielectric constant and a high dielectric strength. In many cases, electroactive polymers may be fabricated and implemented as thin films. Thicknesses suitable for these thin films may be below 50 micrometers.

As electroactive polymers may deflect at high strains, electrodes attached to the polymers should also deflect without compromising mechanical or electrical performance. Generally, electrodes suitable for use may be of any shape and material provided that they are able to supply a suitable voltage to, or receive a suitable voltage from, an electroactive polymer. The voltage may be either constant or varying over time. In one embodiment, the electrodes adhere to a surface of the polymer. Electrodes adhering to the polymer are preferably compliant and conform to the changing shape of the polymer. Correspondingly, the present disclosure may include compliant electrodes that conform to the shape of an electroactive polymer to which they are attached. The electrodes may be only applied to a portion of an electroactive polymer and define an active area according to their geometry. Various types of electrodes suitable for use with the present disclosure include structured electrodes comprising metal traces and charge distribution layers, textured electrodes comprising varying out of plane dimensions, conductive greases such as carbon greases or silver greases, colloidal suspensions, high aspect ratio conductive materials such as carbon fibrils and carbon nano-tubes, and mixtures of ionically conductive materials.

Materials used for electrodes of the present disclosure may vary. Suitable materials used in an electrode may include graphite, carbon black, colloidal suspensions, thin metals including silver and gold, silver filled and carbon filled gels and polymers, and ionically or electronically conductive polymers. It is understood that certain electrode materials may work well with particular polymers and may not work as well for others. By way of example, carbon fibrils work well with acrylic elastomer polymers while not as well with silicone polymers.

Lastly, it is appreciated that High Output Paraffin (HOP) actuators and other materials that exhibit large (e.g., greater than 8 percent) volumetric expansion during solid-to-liquid phase change can be used to provide motive forces for linear actuators. As such, as used herein the term "active materials" shall be deemed to further encompass these materials. With respect to HOP, potential energy in the form of hydrostatic pressure may be produced by constraining the expansion of the paraffin within an actuator body. In one embodiment, the heart of an HOP actuator is a sealed annular chamber containing paraffin in contact with resistance heating elements. When the elements are energized, the paraffin is heated through its melting point. Suitable paraffin expands at least 15 percent in volume during melting. The composition of the paraffin determines the actuation characteristics. The standard paraffin formulation can be varied to provide actuation temperatures from −70° C. to 80° C., wherein the temperature change required for full stroke can be varied from 2° C. to 50° C. The stored pressure can be transformed by the actuator to mechanical work, for example, by linear shaft motion.

II. Exemplary Active Air Intakes, Methods, and Applications

Turning to the structural configuration of the invention, there are shown various embodiments of an active air intake 10 utilizing active material actuation, in FIGS. 1-22. The system 10 includes a housing 22 such as integrally defined by the hood scope 14 of a vehicle, as shown in FIG. 1*a*; otherwise, the housing 22 may be separately mounted to the vehicle 12. The housing 22 defines an opening 24 and conduit through which air flows during relative motion. As such, the opening 24 is defined so as to be oriented towards the flow of fluid (e.g., in the front of the vehicle 12).

As shown in the illustrated embodiments, at least one covering member 26 is securely coupled to the housing 22 and preferably disposed at or near the opening 24. The member 26 is translatable between first and second positions relative to the opening 24, and as such is translatably (e.g., slidably, pivotally, etc.) coupled to the housing 22. In the first position the intake 10 is opened, such that air flow is increased; and in the second position, the intake 10 is closed, such that air flow is decreased and more preferably prevented. Thus, the intake 10 is able to shift from one and to the other of opened and closed conditions, so as to define original and achieved conditions. More preferably, the member 26, and housing 22 are cooperatively configured such that the member 26 is able to achieve a plurality of intermediate positions, and resultantly present plural degrees of openness.

Though singularly described and illustrated, it is appreciated that a plurality of intakes 10 may be utilized, and separately controlled in communication with the engine 12a.

To further prevent fluid flow, the preferred intake 10 further comprises an elastic seal (not shown) disposed about the opening 24. The seal is intermediate the member 26 and housing 22, so as to be compressed thereby in the closed condition.

The motion of the member 26 is driven by an active material actuator 28. The actuator 28 includes an active material element 30 (FIG. 3a-d) operable to undergo a reversible change in fundamental property when exposed to an activation signal, as previously described. The actuator 28 is configured such that the change is operable to cause the member 26 to achieve the modified condition, and where so configured, subsequent activations can be used to achieve both opened and closed conditions.

A power supply 32 is in operative communication with the actuator 28 and operable to provide a suitable activation signal (FIG. 1). The power supply 32 may be automatically demanded via the input device 18, and regulated by a PWM, regulator, or power resistor in-series. For example, in the case of actuators comprising thermally activated shape memory material, a current can be supplied by the power supply 32 to effect Joule heating, when demanded by a vehicle occupant (not shown). More preferably, to help guard against overheating, the supply 32 may be regulated to cyclically provide power to the actuator 28; however, it is appreciated that this may cause slight movement (e.g., flutter and/or buffeting) in the member 26. Alternatively, the power supply 32 may come from an ambient energy source, such as heat energy from the vehicle cooling system, engine, or the Sun, such that the intake 10 is passively activated.

In the exemplary embodiment shown in FIGS. 2-3d, the member 26 presents a single vane (e.g., "flap", or "louver") that rotates between closed and opened positions, so as to define a pivot axis, p. More preferably, the vane 26 is able to rotate ninety-degrees between a vertically closed and horizontally opened positions, and opens forward so as to provide air-assisted closing and sealing. The vane 26 may be coupled to the housing 22 by a hinge 34. The hinge 34 may define an uppermost pivot axis so that the vane 26 swings upward to achieve the opened condition, a lowermost axis wherein the vane 26 swings downward, or an interior axis. Where a horizontally opened position is achieved, the housing 22 preferably defines a recess (not shown) for receiving and shielding the vane 26 in the opened condition.

More particularly, in the illustrated embodiment shown in FIGS. 3a-d, the intake preferably includes a connector 36 for connecting the vane 26 to the actuator 28. The connector 36 is preferably attached to and/or defined by the vane 26 along an outer edge of the vane 26. The connector 36 presents a swing arm that is concentrically aligned with the pivot axis of the member 26, a long arm 38, and a short arm 40. The long arm 38 coextends with the member 26 and defines a first arm length equal to the longitudinal dimension of the member 26. The short arm 40 presents a second arm length preferably less than half, more preferably less than one-quarter, and most preferably less than one-eighth of the first arm length.

The active material element 30 presents a shape memory wire 30 of defined length and is attached to the short arm 40 (FIGS. 3a-d). The wire 30 is attached at one end to the short arm 40 and to the housing 22 or other vehicle structure at the other end. Upon activation by the power supply 32, the length of the wire 30 decreases causing the member 26 to pivot about its axis. Upon discontinuing the activation signal, the wire 30 returns to its original dimension or undergoes a plastic deformation, depending on the active material employed to effect closure of the member 26. As shown in FIG. 3b, once activated the wire 30 is caused to swing as a result of rotation by the short arm 40; to prevent stress accumulation and/or buckling at the fixed end, it is desirous to pivotally connect the wire 30 and housing 22.

Exemplary actuator wires 30 may present stress and strain values of 170 MPa and 2.5%, respectively, so as to result in a sealing force of 2N, when activated. It is appreciated that SMA wires having diameter sizes of 0.012, 0.015, and 0.02 mm present a maximum pull force of 1250, 2000, and 3,560 grams, respectfully. The actuator 28 is preferably configured, such that 2.5 to 12 V, and 2 amps of current are provided to actuate the intake 10. Based on these configurations, actuation times of less than five seconds, an approximate lifetime of 100,000 actuations, and a working environment between −40 to 90° C. have been observed.

In another configuration, the actuator 28 includes at least one shape memory wire 30 that engages the member 26, so as to present a bow-string configuration. That is to say, engagement with the member 26 forms a vertex in the wire 30. It is appreciated that the wire 30 produces a displacement (change in length) when activated that causes the member 26 to translate a distance greater than the displacement due to the trigonometric relationship of the bow-string configuration.

It is also appreciated that where the vane 26 opens towards the front, fluid flow may act to work the member 26 back towards the closed condition. More preferably, however, a biasing mechanism 42 may be drivenly coupled to the member 26, so as to exert a biasing force operable to cause the member 26 to move towards the original condition, when the change is reversed (e.g., the wire 30 is deactivated). For example, as shown in FIG. 3b, a biasing mechanism 42 in the form of a compression return spring may also be attached to the short arm 40 and configured to produce plastic deformation in the cooling wire 30 and effect closure of the member 26. As a result, the member 26 is maintained against the housing 22 in the power-off state such that a fail close configuration is provided (alternatively, a torsion spring may be disposed about the pivot axis and configured to act in the same manner). It is appreciated that the bias spring 42 stretches the shape memory wire 30, so as to cause stress-induced transformation to the martensite phase, in addition to that caused by cooling.

It is also appreciated that the afore-mentioned configurations could be reversed, wherein a compression spring (not shown) works to drive the member 26 open and the wire 30 works to selectively close the intake 10. Moreover, two antagonistic active material actuators, one which would open, and another which would close the intake 10 (or alternatively, a single actuator having a two-way effect), could be utilized.

In the preferred system 10, a latching mechanism 44 (FIGS. 4a-d) is coupled to and configured to selectively engage the member 26, so as to retain the member 26 in the achieved condition, when the change is reversed (i.e., the element 30 is deactivated). For example, in FIGS. 4a-d the latching mechanism 44 is spring driven and configured to cause the mechanism 44 to engage the member 26. A second active material element (e.g., shape memory wire) 46, presenting an activation force greater than the latching force, is operable to cause the mechanism 44 to disengage and release the member 26, when activated.

More particularly, the latching mechanism 44 includes a pawl 48 (FIG. 4a) resistively pivotable about an axis between engaged and disengaged positions, and the connector 36 presents a rotatable gear 50 defining at least one tooth configured to catch the pawl 48 when in the engaged position. More preferably, the gear 50 has a plurality of teeth that enables it to engage the pawl 48 at a plurality of incremental positions resulting in variable degrees of opening (e.g., between 17° and 52°). A spring 52 engaging the pawl 48 is configured to cause the mechanism 44 to engage the member 26. The second wire 46 is oppositely attached to the pawl 48 and contracts when activated, so as to cause the mechanism 44 to disengage and release the member 26.

Alternatively, it is appreciated that the roles of the second element 46 and spring 52 may be reversed by switching their connection points to the pawl 48; that is to say the second element 46 could be configured to cause the mechanism 44 to engage the member 26 when activated, and the biasing spring 52 presents a spring modulus less than the activation force, so as to be configured to cause the mechanism 44 to disengage and release the member 26, only when the second element 46 is deactivated.

Figure 18:
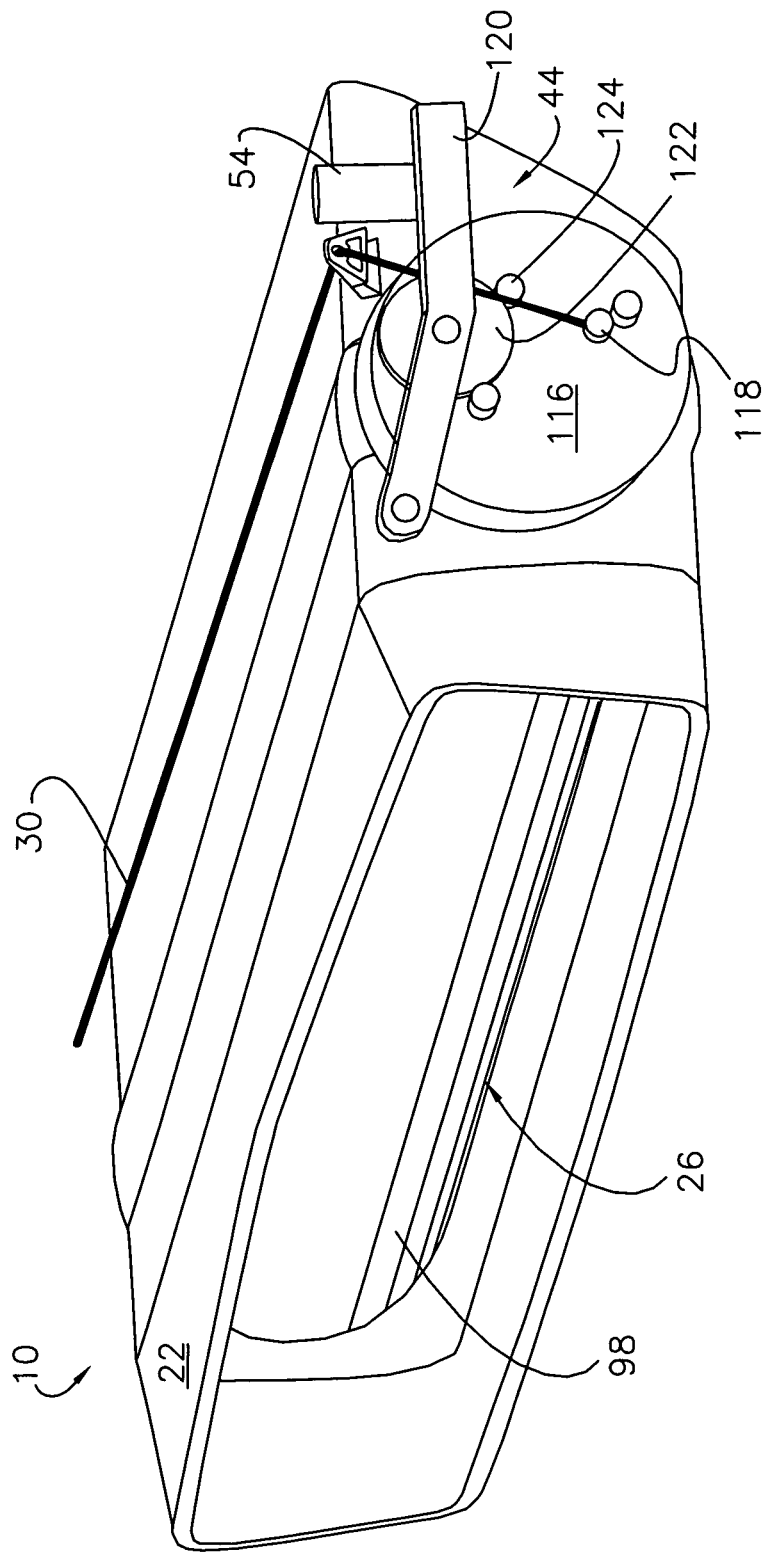
FIG. 18 is a perspective view of an active air intake including a housing, a drum covering member, and an actuator including a shape memory alloy wire engaging the end cap of the drum, and a swing arm and electromagnet latching mechanisms, in accordance with a preferred embodiment of the invention.

As shown in FIG. 18, the intake system 10 may further include an electro-magnet (or solenoid) 54 in lieu of or addition to a spring-based latching mechanism 44. Upon electrical demand, the magnet 54 is caused to selectively engage the member 26 or a metal strip (not shown) attached thereto, so as to retain the member 26 in the achieved condition. Alternatively, it is appreciated that latching can also be accomplished in the middle or at the sides of the intake 10 by using a solenoid pin (also not shown). The magnet (or solenoid) 54 ensures that the intake 10 springs back to the original, and more preferably, the closed condition in case of electrical failure. More particularly, it is appreciated that in order to hold the intake 10 in the opened condition, the solenoid/magnet requires continuous power; whenever power is interrupted (either through controls or failure), the member 26 will unlatch and be caused to return to the closed condition.

Returning to FIGS. 3a-d, the preferred actuator 28 includes a load limit protector 56 coupled to the element 30. The protector 56 is configured to present a secondary output path for the element 30, when exposed to the signal but prevented from the desired motion. This, it is appreciated, provides strain/stress relief capability, and thereby increase the life of the element 30. That is to say, it is appreciated that when an active material undergoes transformation, but is prevented from undergoing the resultant physical change (e.g. heating a stretched SMA wire above its transformation temperature but not allowing the wire to revert to its unstressed state), detrimental affects to material performance and/or longevity can occur. In the present invention, for example, it is foreseeable that the member 26 could by constrained from moving when actuated, either by a foreign object 58 (FIGS. 3c-d) or another form of impediment (e.g., a deformed out body panel blocking motion or ice/mud build up on the intake member). As such, a secondary output path is preferably provided, which allows the element 30 to respond to the activation signal while the condition of member 26 remains unchanged.

For example, in the illustrated embodiments, the wire 30 may be further connected to an extension spring 60 placed in series therewith, and opposite the connector 36 (FIGS. 3a-d). The spring 60 is stretched to a point where its applied preload corresponds to the load level where it is appreciated that the actuator 28 would begin to experience excessive force if blocked. As a result, activation of the actuator 28 will first apply a force trying to open the member 26, but if the force level exceeds the preload in the spring 60 (e.g., the member 26 is blocked), the contraction of the wire 30 will manipulate the spring 60 as opposed to the member 26, thereby providing an output path for the wire strain, and preserving the integrity of the active intake 10 (FIG. 3d).

More preferably, and also shown in FIGS. 3a-d, the protector 56 may include a lever (or "cam") 62 intermediate the element 30 and spring 60. The lever 62 defines first and second arms 64,66 and a pivot axis. Here, the element 30 is attached to the first arm 64, so as to be spaced from the axis a first distance. The spring 60 is attached to the second arm 66, and spaced from the axis a second distance preferably greater than the first. This configuration provides mechanical advantage and facilitates packaging.

Figure 5B:
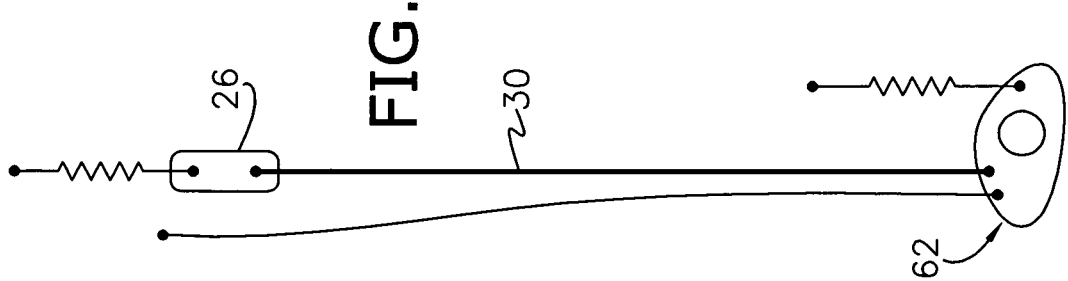
FIG. 5*b* is a schematic elevation of the actuator shown in FIG. 5*a*, wherein the load protector has been actuated.
Figure 5A:
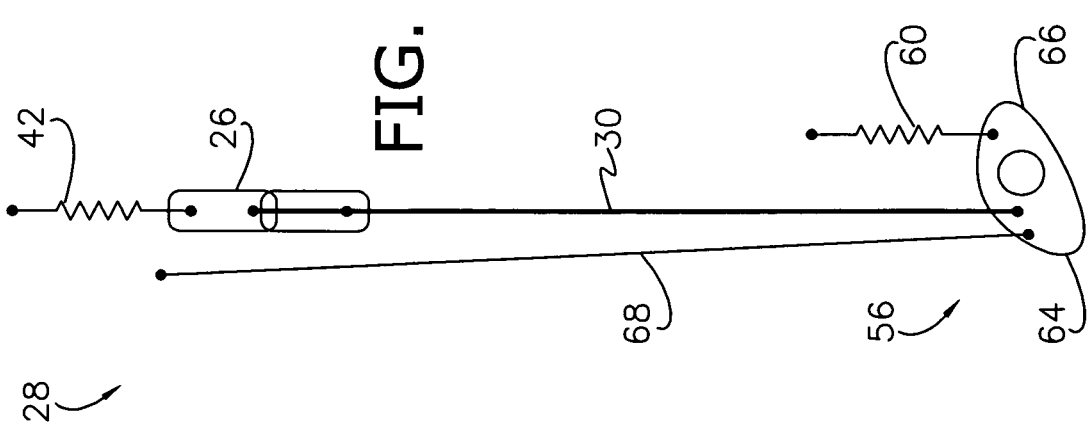
FIG. 5*a* is a schematic elevation of an active intake actuator moving a member, and including a shape memory alloy actuator wire, a return spring, a load protector including an extension spring and lever, and an overheat protection mechanism consisting of an auxiliary SMA wire connected to the lever, in accordance with a preferred embodiment of the invention.

Yet more preferably, the protector 56 further includes an overheat prevention mechanism 68 that guards against undesirable (or unintentional) heating of the actuator 28 and therefore inadvertent actuation of the intake 10. In this regard, it is appreciated that excessive under-hood temperatures may cause the actuator 28 to activate unintentionally. In FIGS. 5a-c, overheat protection is provided by an auxiliary SMA wire 68 presenting a lower transition temperature than the actuator element (e.g., first wire) 30. The auxiliary wire 68 is also attached to the first arm 64 of the lever 62 and to fixed structure (e.g., the housing 22) at the other end. As such, where the actuator and auxiliary wires 30,68 are passively heated, the auxiliary SMA wire 68 will be caused to activate first, thereby contracting and pulling the lever 62 towards the actuator wire 30 (FIG. 5c). This causes slack to form in the actuator wire 30, which enables it to be activated without experiencing a stress load.

In the bow-string configuration of FIG. 6a-c, the protector 56 includes first and second stretched springs 60a,b connected in series with the wire 30. Likewise, first and second levers 62a,b are preferably disposed intermediate the wire 30 and springs 60a,b. Each lever 62 defines first and second arms and a pivot axis. The wire 30 is attached to the first arms 64a,b and spaced from the axes a first distance, and the springs 60a,b are attached to the second arms 66a,b and spaced from the axes a second distance preferably greater than the first so as to provide mechanical advantage. The protector 56 preferably includes an auxiliary (or second) shape memory wire 68 interconnecting the levers 62a,b. The auxiliary wire 68, when activated, causes the levers 62a,b to rotate inward (FIG. 6c) without affecting the position of the member 26, which thereby produces slack and relieves stress in the actuator wire 30.

Figure 7B:
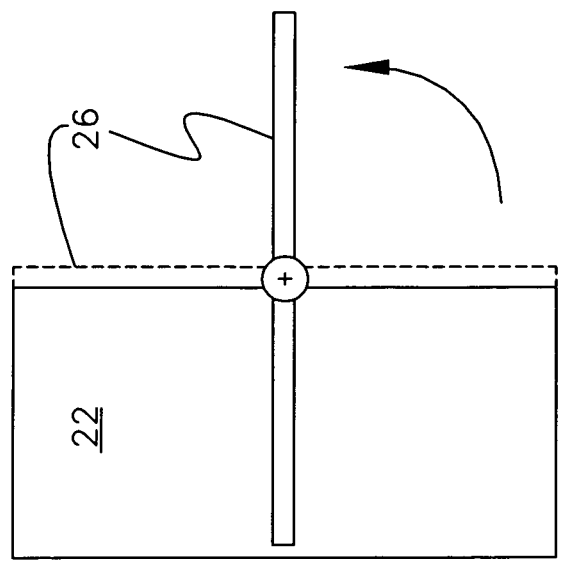
FIG. 7*b* is a side elevation of the intake shown in FIG. 7*a*, wherein the flap is shown swung to a fully opened condition, and in hidden-line type, back to the fully closed condition.
Figure 7A:
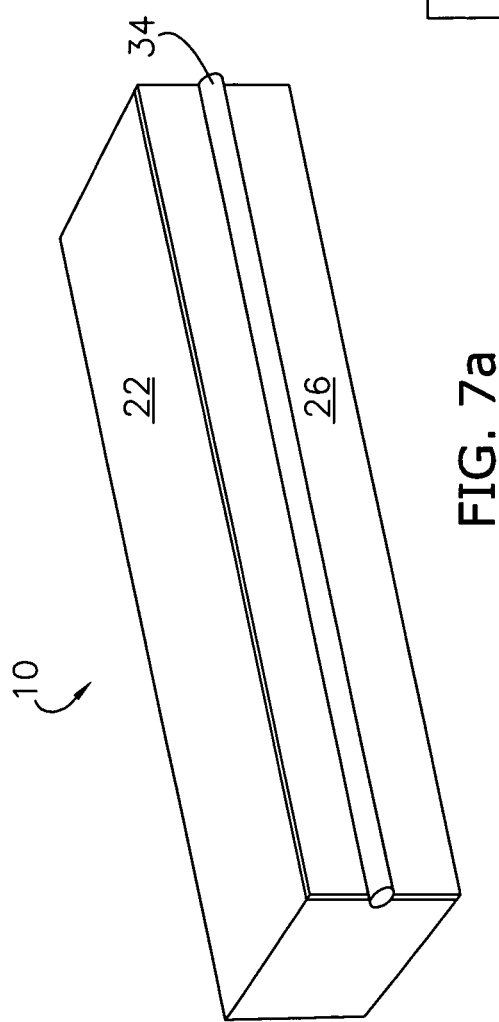
FIG. 7*a* is a perspective view of a single flap intake having a pivot axis medially located, in accordance with a preferred embodiment of the present invention.

As previously stated, the vane member 26 may define a medial pivot axis, so as to be able to rotate about its longitudinal mid-line (FIGS. 7a-b). In this configuration it is appreciated that half of the member 26 will extend within the housing 22 in the opened condition, resulting in less protrusion from the opening 24. The vane 26 may be caused to pivot by an SMA wire connected to and configured to pull the vane 26; or more preferably an SMA torque tube or other rotational actuator may be utilized. To save space, the intake 10 preferably includes a multi-vane louver configuration, wherein a plurality of louvers 26 are inter-linked, and conjunctively actuated, so as to be caused to move congruently and in unison (FIGS. 8-12b). In this configuration, adjacent louvers may be connected by a four-bar linkage system 70, as is known in the art.

Figure 8:
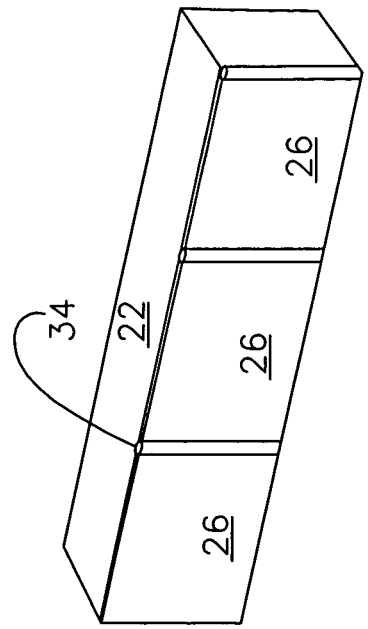
FIG. 8 is a perspective view of an active material based intake having multiple horizontal pivot axes and associated flaps, in accordance with a preferred embodiment of the present invention.
Figure 9:
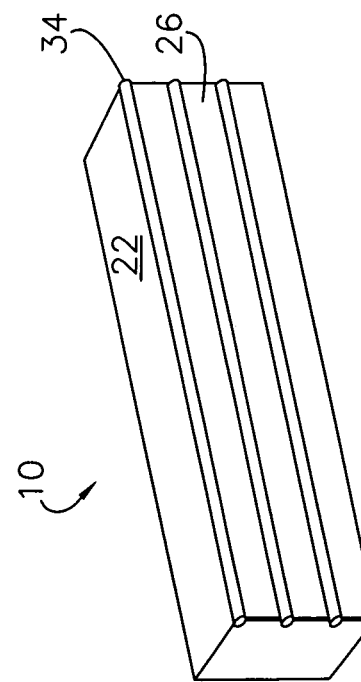
FIG. 9 is a perspective view of an active material based intake having multiple vertical pivot axes and associated flaps, in accordance with a preferred embodiment of the present invention.
Figure 10B:
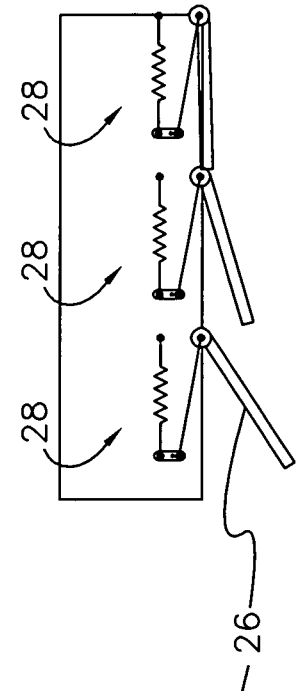
FIG. 10*b* is a side elevation of the intake shown in FIG. 10*a*, wherein a plurality of separately functioning active material actuators engages the flaps to varying degrees, in accordance with a preferred embodiment of the present invention.
Figure 10A:
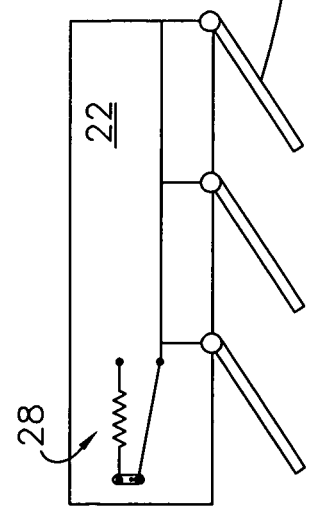
FIG. 10*a* is a side elevation of the intake shown in FIG. 8, and a top elevation of the intake shown in FIG. 9, wherein a single active material actuator engages the flaps, in accordance with a preferred embodiment of the present invention.

FIGS. 8 and 9 depict intakes 10 having a plurality of horizontal or vertically oriented vanes 26 that are each pivotally connected to the housing 22 so as to define an equal plurality of pivot axes. A single actuator 28 may be connected to each of the members 26 and configured to effect congruent motion, as shown in FIG. 10a; or more preferably, a separate actuator 28 may control movement of an associative member 26 as shown in FIG. 10b. Again, the members 26 are preferably biased so as to sealingly close a portion of the opening, when the associative element 30 is deactivated. A single latch 44 (or detent) may directly engage the linkage system 70 as opposed to the vanes 26, where uniform motion is provided; or plural latches 44 may individually engage a plurality of separately functioning vanes.

Figure 11B:
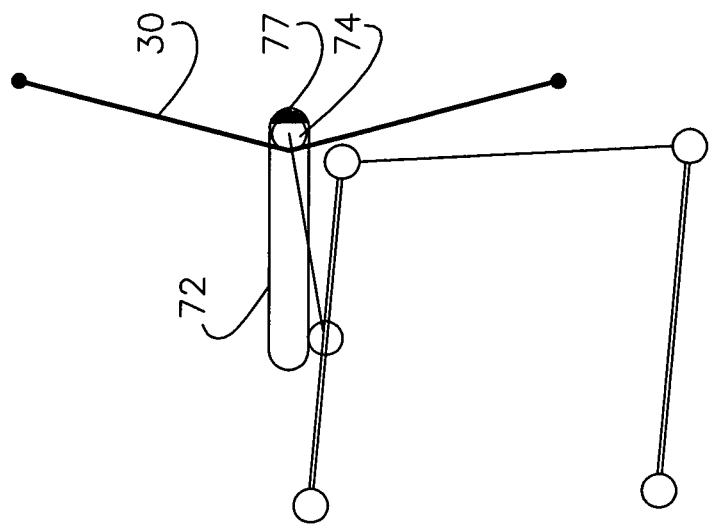
FIG. 11*b* is an elevation of the vanes and actuator shown in FIG. 11*a*, wherein the wire has been activated and the vanes have been caused to swing forward as a result thereof.
Figure 11A:
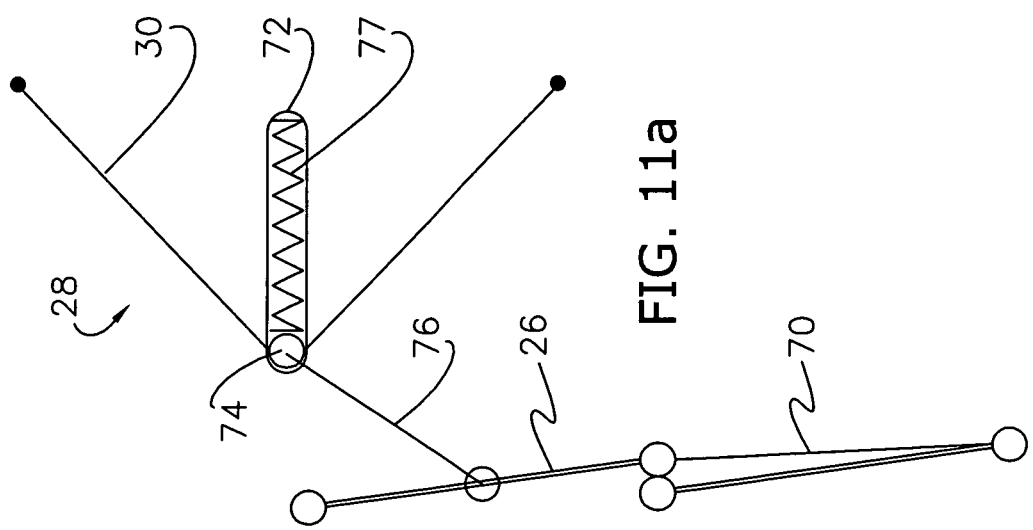
FIG. 11*a* is a side elevation of a multi-vane covering member, housing slot, and actuator including a runner linearly translatable within the slot, a shape memory alloy actuator wire in bow-string configuration engaging the runner, a link interconnecting the top vane and runner, and a return spring acting within the slot to engage the runner, in accordance with a preferred embodiment of the invention.

In the configuration shown in FIGS. 11a-b, the housing 22 defines a slot 72, a runner 74 is reposed, so as to be linearly translatable, within the slot 72, and an SMA wire 30 engages the runner 74, so as to present a bow-string configuration. The wire 30 is fixedly attached to the housing 22 or other structure at its distal ends, and more particularly connected thereto, through load limit protectors 56, as previously described. A fixed length link 76 is rotatably coupled to the runner 74 and preferably the top vane 26 to facilitate packaging and reduces obstruction. The linked vanes 26 are caused to rotate by the linear translation of the runner 74, which is caused by activating the wire 30 (FIG. 11b). A biasing spring 77 may be disposed within the slot 72 and configured to bias the vanes 26 towards the closed condition.

Figure 12B:
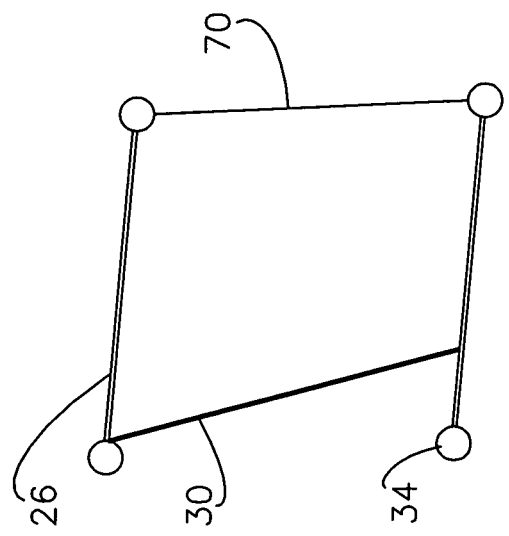
FIG. 12*b* is an elevation of the vanes and actuator shown in FIG. 12*a*, wherein the wire has been activated and the vanes have been caused to swing forward as a result thereof.
Figure 12A:
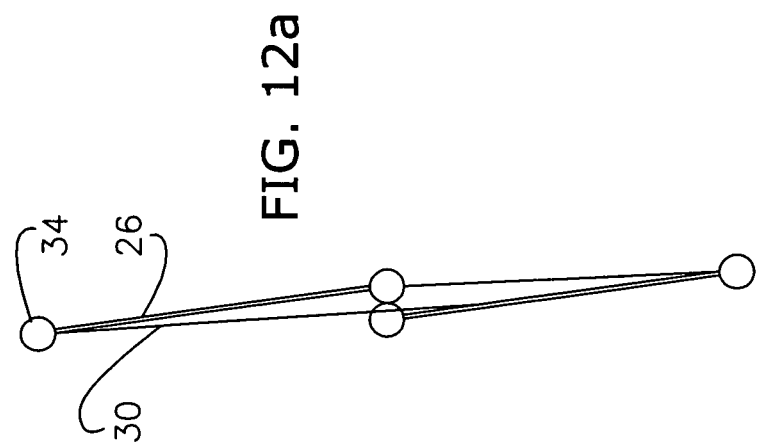
FIG. 12*a* is a side elevation of a multi-vane covering member, and actuator consisting of a shape memory alloy actuator wire interconnecting the vanes, in accordance with a preferred embodiment of the invention.
Figure 13:
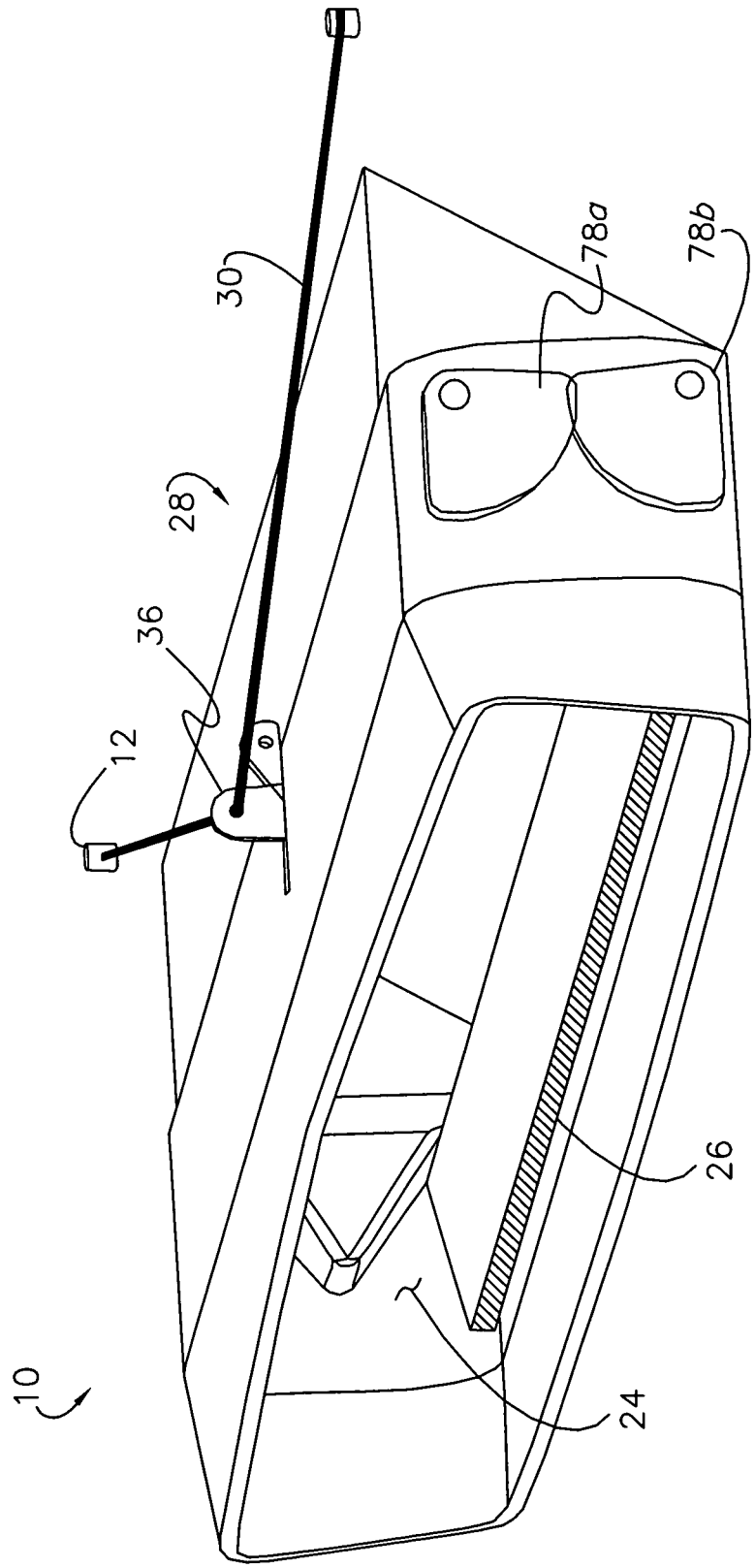
FIG. 13 is a perspective view of an intake including a housing, a multi-vane covering member coupled by inter-engaged gears so as to oppositely rotate, and an actuator including a shape memory alloy wire in bow-string configuration, in accordance with a preferred embodiment of the invention.

More efficiently, adjacent vanes 26 may be interconnected by an SMA wire 30 (FIG. 12a-b), such that contraction of the wire 30 causes the vanes 26 to swing outward towards the opened condition. For example, for forward swinging vanes 26, the wire 30 may be preferably attached to the inner surface of the upper adjacent vane 26a, and to the outer surface of the lower adjacent vane 26b. The wire 30 presents a deactivated length greater than the vane height, and as such is preferably attached to a point on the lower vane 26b that is correspondingly lower than the attachment point of the upper vane 26a. More preferably, the wire 30 is attached to the pivot axis of the upper adjacent vane 26a, and to the top half of the lower vane 26b, as best shown in FIG. 12b. The wire 30 is preferably configured so as to present an activated length generally equal to the vane height, so that the vanes 26 are caused to achieve generally horizontal orientations in the opened condition. In this configuration, it is appreciated that the actuator 28 is self-contained within the intake 10, and that the number of actuator parts is reduced.

In other embodiment, mirrored upper and lower vanes 26a,b are caused to oppositely rotate, so as to remove obstruction in the central region of the opening 24 (FIGS. 13-16b). In this configuration, the vanes 26a,b are preferably angled towards the opening 24 in the closed condition, and cooperatively configured to present overlapping distal edges (FIG. 14a), which causes fluid flow during motion to seal the intake 10 in the closed condition.

The mirrored vanes 26a,b are preferably linked, so as to be caused to move in unison, when only one is driven. For example, the vanes 26a,b may be inter-engaged by first and second gears 78a,b, as shown in FIGS. 14a-b. In the illustrated embodiment, the actuator 28 includes a pulley 80 concentrically aligned with the upper vane pivot axis, and an SMA wire 30 connected to the lower vane 26b. The wire 30 is entrained by the pulley 80, so as to be redirected towards a horizontal orientation that enables greater wire length. It is appreciated that the actuator 28 in this configuration can be completely housed on the sides of the intake 10, thereby clearing the fluid flow passageway. Exemplarily, where the wire 30 is activated the lower vane 26b is caused to swing forward. Accordingly, the lower vane 26b further presents a short actuator engaging section 26c. Where the vane axes are spaced 50 mm apart, the section 26c may present a 15 mm length. Through the inter-engagement between the gears 78a,b, the upper vane 26a is also caused to swing forward. It is appreciated that through gear ratios the upper vane 26a may be caused to swing a greater or lesser distance than the lower vane 26b; and as a result, the upper and lower vanes 26a,b may present differing lengths or configurations.

Figure 15B:
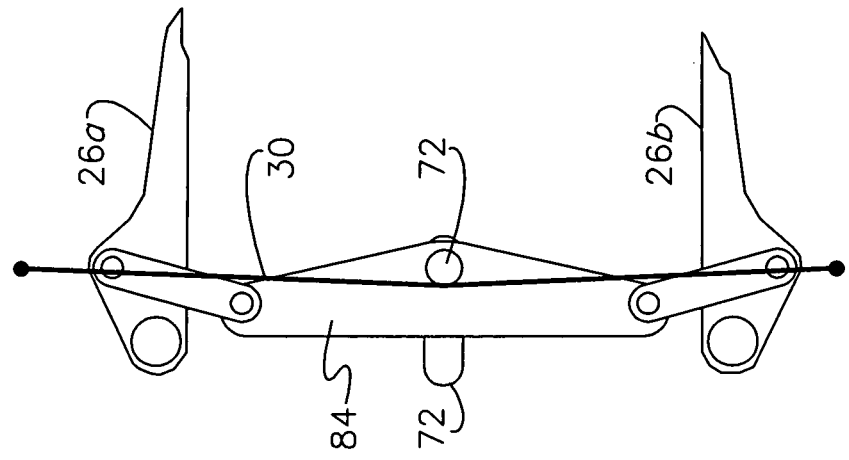
FIG. 15*b* is a side elevation of the intake shown in FIG. 15*a*, wherein the wire has been activated, and the vanes caused to swing forward as a result thereof.
Figure 15A:
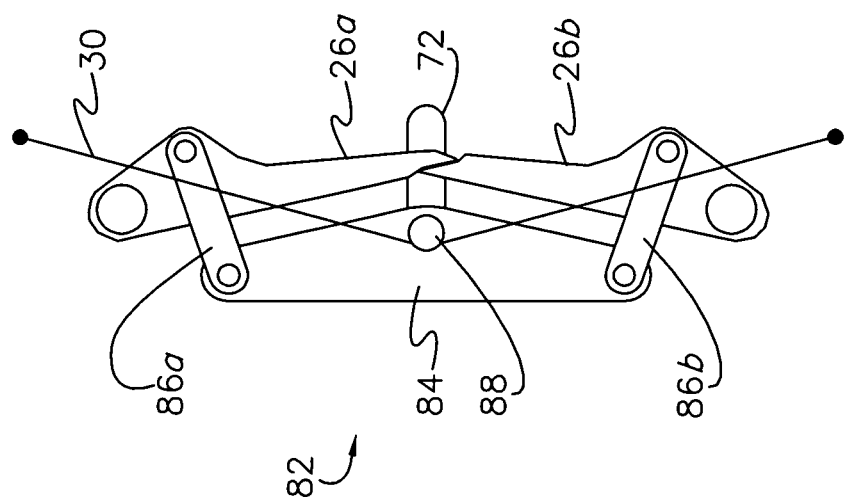
FIG. 15*a* is a side elevation of a housing slot, multi-vane covering member coupled by a three-piece link including a main bar configured to linearly translate within the slot and first and second swing arms, and an actuator including a shape memory alloy wire engaging the main bar in a bow-string configuration, in accordance with a preferred embodiment of the invention.
Figure 16B:
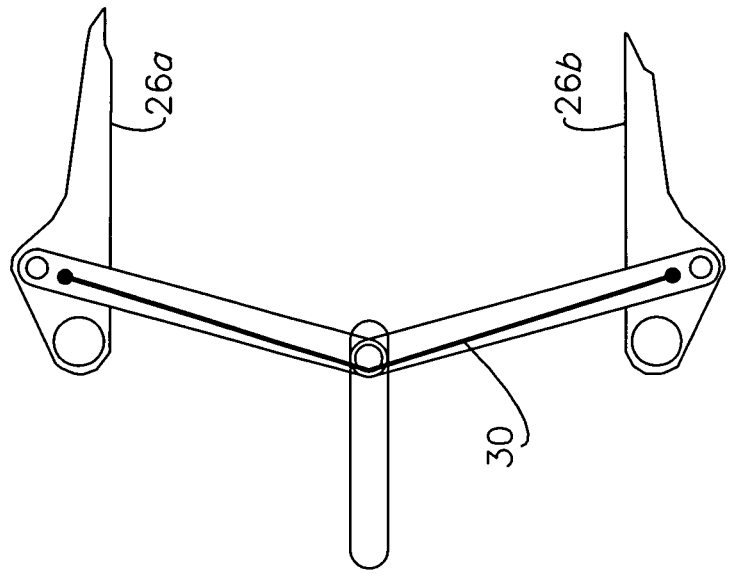
FIG. 16*b* is a side elevation of the intake shown in FIG. 16*a*, wherein the wire has been activated, and the vanes caused to swing forward as a result thereof.
Figure 16A:
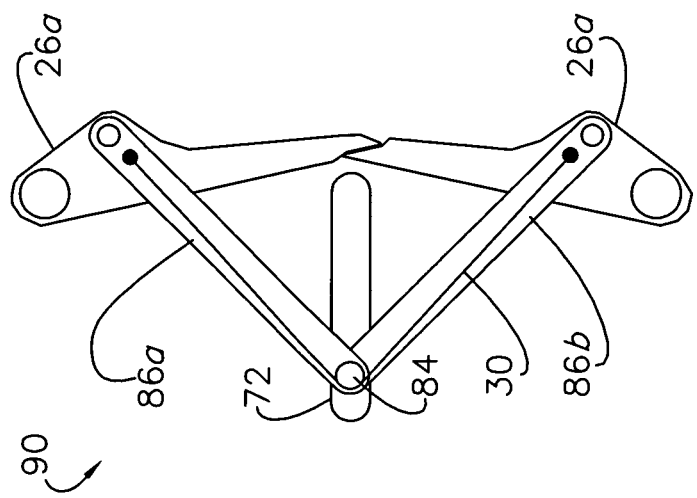
FIG. 16*a* is a side elevation of a housing slot, multi-vane covering member coupled by a scissor drive including a central prong configured to linearly translate within the slot and first and second swing arms, and an actuator including a shape memory alloy wire connected to the arms, and engaging the prong in a bow-string configuration, in accordance with a preferred embodiment of the invention.

Alternatively, and as shown in FIGS. 15a-b, wherein the housing 22 again defines a slot 72, the vanes 26a,b may be inter-engaged by a sliding three-piece link 82. The link 82 includes a main bar 84 disposed within the slot 72 so as to be linearly translatable relative thereto. First and second swing arms 86a,b are pivotally connected to the main bar 84. At their opposite ends, the swing arms 86a,b are pivotally connected to the respective vanes 26a,b, which define fixed pivot axes. As a result, the vanes 26a,b are configured to mutually and congruently rotate in opposite directions when the main bar 84 is caused to linearly translate (FIG. 15b). More particularly, the swing arms 86a,b are connected to the main bar 84 at fixed points, so as to define a first spacing distance, and to the vanes 26a,b, such that the vane connection points define a distance greater than the first at their closest (e.g., closed condition) point.

In this configuration (FIGS. 15a-b), the actuator 28 may consists essentially of an SMA wire 30 fixedly attached to the housing 22 or otherwise fixed structure, and more preferably connected thereto through a load limit protector 56 as previously described. The wire 30 is entrained by a prong 88 attached to the main bar 84, and is thereby caused to present a bow-string configuration. More preferably, the prong 88 tracks (and may present a continuous body disposed within) the slot 72 (FIG. 15a-b), so as to reduce moments during actuation. Again a biasing mechanism 44, such as a compression spring (not shown), may be disposed within the slot 72, and configured to engage the main bar 84 as it translates, so as to bias the intake 10 towards the closed condition.

In another alternative to the mirrored-vanes embodiment (FIGS. 16a-b), the three-piece link 82 is modified to present a sliding scissor drive 90 by extending the swing arms 86a,b and juxtaposing the main bar 84 with a prong or runner disposed within the slot 72. The prong 84 presents a pivot joint about which the swing arms 86a,b rotatably translate between a collapsed closed condition, and a more obtuse opened condition (compare FIGS. 16a-b). In this configuration, the actuator 28 may consist of an SMA wire 30 fixedly attached to the swing arms 86a,b preferably at or near their distal or vane connected ends, so as to be completely self contained. The wire 30 is again entrained about the prong such that the contraction of the wire 30 and fixed pivot axes of the vanes 26 cause the prong to linearly translate, and the arms 86a,b and therefore the vanes 26a,b to swing outward. Finally, load limit protection may be further provided and also attached to the arms 86a,b.

In another embodiment, the covering member 26 includes a plurality of adjacently positioned sliding panels 92, wherein each panel 92 defines at least one hole 94 (FIGS. 17a-b). The holes 94 are able to be selectively aligned so as to cooperatively define a through-hole 96, in the opened condition. In this configuration, the actuator 28 may consist of an SMA wire 30 that diagonally interconnects the panels 92. For example, and as shown in FIGS. 17a-b, a plurality of three panels 92a,b,c, are configured to cooperatively define a plurality of four through-holes 96 in sets of two, may be interconnected by an SMA wire 30 attached to the tops of the panels 92*a,b,c*. The wire 30 is attached to the mid panel 92*b* at its mid-point such that the mid panel 92*b* is caused to slide a relative distance equal to one-half the relative distance traveled by the outer panels 92*a,c*.

The wire 30 and panels 92*a,b,c* are cooperatively configured such that the holes 94 are completely offset, such that fluid flow is occluded, when the wire 30 is deactivated (FIG. 17*a*), and completely aligned, such that fluid flow is allowed, when the wire 30 is activated. Where necessary, a rubber bulb (not shown) is provided to fill gaps formed in between the panels 92*a,b,c*, in the closed condition. Finally, to provide a return, it is appreciated that at least one spring (also not shown) may be securely positioned adjacent a lateral edge of each panel 92, and may be an extension or compression spring depending upon whether the panel 92 slides towards or away from it.

In yet another embodiment, the member 26 presents a drum 98 defining a through-slot 100 (FIGS. 18-22). The drum 98 is disposed within and rotatable relative to the housing 22 (FIG. 18, 20*a-b*), such that the slot 100 and opening 24 may be selectively aligned (FIGS. 20*a-b*). For use as a vehicular air intake, the slot 100 may be 35 mm in height. In this configuration, the actuator 28 is configured, such that activation of the element 30 causes the rotation of the drum. For example, and as shown in FIG. 18, an SMA wire 30 may be connected to the drum 98 and configured, such that a moment about the drum axis is caused by activating the wire 30. More particularly, in the closed condition (FIG. 20*a*), the through-slot 100 is vertically oriented so as to be caped by the housing 22; in the opened condition (FIG. 20*b*), the opening 24 is horizontally aligned with the slot 100, so as to cooperatively present an open passageway. The wire 30 is therefore sized to produce the actuation force and drum displacement necessary to effect the required degree (e.g., 90°) of rotation.

Alternatively, the member 26 may present a non-symmetric 102 (FIG. 21) or half-drum 104 (FIG. 22) configuration, wherein the modified drum is rotated ninety degrees between a horizontally closed and a vertically opened position. It is appreciated that packaging, complexity, and mass are reduced in these configuration, as full 360° revolutions and drum accommodations are not necessitated. It is also appreciated that the drum 98 may present orthogonally crossed-slots (FIG. 23), so that a rotation angle of only 45° is required to open and close the intake 10. Finally, in drum configurations, the housing 22 preferably defines drain holes 106 (FIG. 20*a*) to avoid moisture capture.

In the illustrated embodiment shown in FIG. 19, the member 26 includes a ratchet interface 108 defined or affixed to the actuated end of the drum 98. The actuator 28 includes a pawl 110 in biased engagement with the interface 108. More particularly, the interface 108 includes an axle or pin 112 concentrically aligned with the pivot axis of the drum 98, while the pawl 110 defines a hole configured to freely receive the pin 112. A compression spring (not shown) engages the pawl 110 pushing it towards the interface 108. As is appreciated in the art, the interface 108 and pawl 110 cooperatively define a plurality of inter-meshing teeth (also not shown) that present sloped engaging surfaces in one direction of rotation, but fully engage in the other, so as to allow relative rotation in only one direction.

In this configuration, the latching mechanism 44 may include a leaf spring 114 (FIG. 19) configured to engage, so as to produce a downward biasing force against the interface 108, thereby preventing the drum 98 from rotating in the available direction. The leaf spring 114 is supported against the housing 22 or otherwise fixed structure. The actuation force produced by the wire 30 is sufficient to overcome the biasing force of the leaf spring 114, so as to cause both the pawl 110 and drum 98 to rotate in ninety-degree increments.

More particularly, as the SMA wire 30 cools, a return spring connected to the pawl 110 stretches the SMA wire 30 and returns the pawl 110 to its original position. The ratchet teeth slide over each other to allow the pawl 110 to return, while the leaf spring 114 holds the drum 98 in position. Once the wire 30 is cooled and re-stretched, the actuator 28 is ready for another cycle, and ninety-degrees of more rotation. Thus, because of the configuration of the drum 98 and ratchet interface 108, a single SMA wire 30 can both open and close the intake 10 by pulling in one direction.

In the alternative latching configuration shown in FIG. 18, the drum 98 presents a distal end cap 116 engaged by the actuator 28. An SMA wire 30 is connected to a prong 118 attached to the end cap 116 at a second quarter location, when the drum 98 is in the opened condition. The wire 30 is configured, such that activation results in the prong 118 being caused to rotate ninety-degrees to the first quadrant of the cap 116. Further, a return torsion spring (not shown) is caused to store potential energy by the wire actuation. The spring releases the energy upon deactivation (or as the wire cools), thereby causing the drum 98 to rotate back to the normally opened condition.

As further shown in FIG. 18, the latching mechanism 44 is presented by a biased swing arm 120 defining a bend and an engaging disc 122 concentrically aligned with the midline of the bend. The cap 116 defines three equally spaced latch engaging prongs 124 that define an "L"-shape so as to engage or retain the mechanism 44 in both the opened and closed (FIG. 18) conditions. As such, it is appreciated that the actuation and return forces are both sufficient to overcome the latch strength. Alternatively, where insufficient, it is also appreciated that an electromagnet 54 (FIG. 18) may be added to selectively engage and raise the arm 120, thereby freeing the drum 98 to achieve the modified condition.

It is contemplated that other active material actuator configurations, such as torque tubes coupled with an antagonistically biased torsion springs may be implemented to effect rotational motion. It is also understood that other active materials, besides SMA, could alternatively be employed as the active material element 30, including electroactive polymers in the form of rolled or thin strips of dielectric elastomers and piezoelectric uni-morphs or bi-morphs, both of which could provide rapid, reversible, and field strength proportional displacement. Moreover, it is understood that the element 30 could take geometric forms, other than a singular wire, such as, for example, several wires in parallel (e.g., bundles), several wires braided or twisted together as a cable, and thin strips. As such, it is appreciated that the term "wire" encompasses these other suitable geometric forms. It is also within the ambit of the invention to variously employ rotating, folding, sliding or iris-type covering members 26 consistent with the invention.

Thus, an inventive method of selectively modifying the quantity of air flow into a vehicle engine includes fluidly coupling the engine 12*a* and an ambient environment through an opening 24, and securing a translatable member operable to occlude at least a portion of the opening 24. The member 26 is drivenly coupled to an actuator 28 including an active material element. A sample value of an environmental condition or vehicle characteristic is then autonomously determined by a sensor 16. The sensor 16 conveys information relating to the value to a controller 20 programmably configured to compare the sample value to a threshold, and where the threshold is exceeded, the controller 20 is further configured to find a non-compliant value.

When a non-compliant value is determined, the element 30 is activated, and the opening 24 is modified as a result of activation, so as to modify fluid flow into the engine 12*a*. Without limitation, it is appreciated that the sensor 16 may be a speedometer, psychrometer, hygrometer or otherwise temperature/humidity sensor, tachometer or otherwise engine speed sensor, dynamometer or otherwise engine torque sensor, or a telematic system configured to determine a position of the vehicle using a positioning system, and retrieve the sample value from a map database based on the position.

Ranges disclosed herein are inclusive and combinable (e.g., ranges of "up to about 25 wt %, or, more specifically, about 5 wt % to about 20 wt %", is inclusive of the endpoints and all intermediate values of the ranges of "about 5 wt % to about 25 wt %," etc.). "Combination" is inclusive of blends, mixtures, alloys, reaction products, and the like. Furthermore, the terms "first," "second," and the like, herein do not denote any order, quantity, or importance, but rather are used to distinguish one element from another, and the terms "a" and "an" herein do not denote a limitation of quantity, but rather denote the presence of at least one of the referenced item. The modifier "about" used in connection with a quantity is inclusive of the state value and has the meaning dictated by context, (e.g., includes the degree of error associated with measurement of the particular quantity). The suffix "(s)" as used herein is intended to include both the singular and the plural of the term that it modifies, thereby including one or more of that term (e.g., the colorant(s) includes one or more colorants). Reference throughout the specification to "one embodiment", "another embodiment", "an embodiment", and so forth, means that a particular element (e.g., feature, structure, and/or characteristic) described in connection with the embodiment is included in at least one embodiment described herein, and may or may not be present in other embodiments. In addition, it is to be understood that the described elements may be combined in any suitable manner in the various embodiments.

Suitable algorithms, processing capability, and sensor inputs are well within the skill of those in the art in view of this disclosure. This invention has been described with reference to exemplary embodiments; it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to a particular embodiment disclosed as the best mode contemplated for carrying out this invention, but that the invention will include all embodiments falling within the scope of the appended claims.

What is claimed is:

1. An active air intake adapted for use with an internal combustion engine, said intake comprising:
    a housing defining an opening in fluid communication with an ambient environment and the engine;
    at least one covering member translatable, so as to be caused to move between opened and closed conditions, relative to the opening, wherein the member covers at least a portion of the opening in the closed condition, and does not obstruct the portion, so as to allow an increase in fluid flow between the environment and the engine in the opened condition; and
    at least one actuator drivenly coupled to the member, and including an active material element operable to undergo a reversible change in fundamental property when exposed to an activation signal, said actuator being configured such that the change is operable to cause or enable the member to move to one of the opened and closed conditions;
    wherein the member includes a ratchet interface and the actuator includes a pawl in biased engagement with the interface, the pawl and interface being cooperatively configured so as to allow relative rotation only in one direction.

2. The intake as claimed in claim 1, wherein the active material is selected from the group consisting of shape memory alloys, ferromagnetic shape memory alloys, shape memory polymers, piezoelectric materials, electroactive polymers, magnetorheological fluids and elastomers, electrorheological fluids, and composites of the same.

3. The intake as claimed in claim 1, further comprising:
    a biasing mechanism drivenly coupled to the member, so as to exert a biasing force thereupon, wherein the force is operable to cause the member to move to the other of said open and closed conditions, when the change is reversed.

4. The intake as claimed in claim 1, further comprising:
    a latching mechanism coupled to and configured to selectively engage the member, so as to retain the member in said one of the opened and closed conditions when the change is reversed.

5. A method, using the active air intake as claimed in claim 1, of selectively modifying fluid flow into the engine, said method comprising the steps of:
    a. fluidly coupling the engine to the ambient environment through the opening, so as to allow fluid flow therebetween;
    b. securing the active material element relative to the opening;
    c. determining a sample value of an environment condition or vehicle characteristic;
    d. comparing the sample value to a threshold, and determining a non-compliant value, when the sample value exceeds the threshold;
    e. activating the element when the non-compliant value is determined; and
    f. modifying the opening, so as to modify the fluid flow, as a result of activating the element.

6. The method as claimed in claim 5, wherein step c) further includes the steps of securing at least one sensor relative to the engine or environment and detecting the value using the sensor.

7. The method as claimed in claim 6, wherein the sensor is a speedometer, dynamometer, tachometer, psychrometer, thermo-hygrometer, or a positioning system operable to determine the position of the engine and retrieve the sample value from a map database correlated to the position.

8. An active air intake adapted for use with an internal combustion engine, said intake comprising:
    a housing defining an opening in fluid communication with an ambient environment and the engine;
    at least one covering member translatable, so as to be caused to move between opened and closed conditions, relative to the opening, wherein the member covers at least a portion of the opening in the closed condition, and does not obstruct the portion, so as to allow an increase in fluid flow between the environment and the engine in the opened condition;
    at least one actuator drivenly coupled to the member, and including an active material element operable to undergo a reversible change in fundamental property when exposed to an activation signal, said actuator being configured such that the change is operable to cause or enable the member to move to one of the opened and closed conditions; and a latching mechanism coupled to and configured to selectively engage the member, so as to retain the member in said one of the opened and closed conditions when the change is reversed;

wherein the latching mechanism includes a biasing spring configured to cause the mechanism to engage the member, and a second active material element presenting as activation force greater than the spring modulus of the spring, so as to be operable to cause the mechanism to disengage and release the member, when the mechanism is engaged with the member and the second element is activated.

9. The intake as claimed in claim 8, wherein the active material is selected from the group consisting of shape memory alloys, ferromagnetic shape memory alloys, shape memory polymers, piezoelectric materials, electroactive polymers, magnetorheological fluids and elastomers, electrorheological fluids, and composites of the same.

10. An active air intake adapted for use with an internal combustion engine, said intake comprising:

a housing defining an opening in fluid communication with an ambient environment and the engine;

at least one covering member translatable, so as to be caused to move between opened and closed conditions, relative to the opening, wherein the member covers at least a portion of the opening in the closed condition, and does not obstruct the portion, so as to allow an increase in fluid flow between the environment and the engine in the opened condition;

at least one actuator drivenly coupled to the member, and including an active material element operable to undergo a reversible change in fundamental property when exposed to an activation signal, said actuator being configured such that the change is operable to cause or enable the member to move to one of the opened and closed conditions; and a load limit protector coupled to and configured to present a secondary output path for the element, when the element is exposed to the signal and the member is prevented from motion to said one of the open and closed conditions.

11. The intake as claimed in claim 10, wherein the protector includes at least one stretched spring connected in series to the element.

12. The intake as claimed in claim 11, wherein the protector further includes a lever intermediate the element and spring, the lever defines first and second arms and a pivot axis, the element is attached to one of the arms and spaced from the axis a first distance, and the spring is attached to the other of the arms and spaced from the axis a second distance greater than the first.

13. The intake as claimed in claim 11, wherein the protector further includes an auxiliary shape memory element connected to the lever and configured to cause the lever to rotate towards, so as to relieve stress and produce slack in the actuator element and present an overheat protection mechanism.

14. The intake as claimed in claim 10, wherein the active material is selected from the group consisting of shape memory alloys, ferromagnetic shape memory alloys, shape memory polymers, piezoelectric materials, electroactive polymers, magnetorheological fluids and elastomers, electrorheological fluids, and composites of the same.

* * * * *